United States Patent
Kailey et al.

(10) Patent No.: US 12,373,661 B2
(45) Date of Patent: Jul. 29, 2025

(54) VECTORIZED INTERLEAVE OF BIT PLANES

(71) Applicants: Walter F. Kailey, Frederick, CO (US); Florin Neagu, Timisoara (RO)

(72) Inventors: Walter F. Kailey, Frederick, CO (US); Florin Neagu, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 18/540,688

(22) Filed: Dec. 14, 2023

(65) Prior Publication Data

US 2025/0200315 A1    Jun. 19, 2025

(51) Int. Cl.
   *G06K 15/02*    (2006.01)
(52) U.S. Cl.
   CPC ..... *G06K 15/1835* (2013.01); *G06K 15/1881* (2013.01)
(58) Field of Classification Search
   None
   See application file for complete search history.

(56) References Cited

U.S. PATENT DOCUMENTS

| | | | |
|---|---|---|---|
| 6,744,929 B1 * | 6/2004 | Okada | H04N 19/37 375/E7.184 |
| 7,046,863 B2 | 5/2006 | Chang et al. | |
| 7,085,015 B2 | 8/2006 | Bhattacharjya | |
| 7,102,789 B2 | 9/2006 | Chang | |
| 7,158,263 B2 | 1/2007 | Allen et al. | |
| 7,315,261 B2 | 1/2008 | Zbiciak | |
| 7,782,493 B2 | 8/2010 | Asai et al. | |
| 7,830,569 B2 | 11/2010 | Tai et al. | |
| 7,911,646 B2 | 3/2011 | Chang | |
| 7,969,616 B2 | 6/2011 | Ota | |
| 8,018,623 B2 | 9/2011 | Couwenhoven et al. | |
| 8,035,860 B2 | 10/2011 | Li et al. | |
| 8,437,043 B2 | 5/2013 | Ebner et al. | |
| 8,472,080 B2 | 6/2013 | Kang | |
| 8,542,409 B2 | 9/2013 | Wakayama et al. | |
| 8,550,589 B2 | 10/2013 | Mizutani | |
| 8,861,034 B2 | 10/2014 | Li et al. | |

(Continued)

FOREIGN PATENT DOCUMENTS

| | | |
|---|---|---|
| JP | 4442899 B2 | 3/2010 |
| JP | 5342357 B2 | 11/2013 |

(Continued)

*Primary Examiner* — Thomas D Lee
(74) *Attorney, Agent, or Firm* — Duft & Bornsen, PC

(57) ABSTRACT

A bit plane converter and associated methods. In an embodiment, the bit plane converter is configured to receive a first bit plane comprising low-order bits for an array of pixels, and a second bit plane comprising higher-order bits for the pixels. The bit plane converter is configured to perform an interleave process on the pixels to generate bit fields for the pixels by processing low nibbles of a low-order word and the low nibbles of a higher-order word using a lookup table to generate a bitwise interleaved low nibble vector, processing high nibbles of the low-order word and the high nibbles of the higher-order word using the lookup table to generate a bitwise interleaved high nibble vector, and interleaving bytes of the bitwise interleaved low nibble vector with bytes of the bitwise interleaved high nibble vector to generate a bitwise interleaved vector.

20 Claims, 31 Drawing Sheets

(56) References Cited

U.S. PATENT DOCUMENTS

| | | | |
|---|---|---|---|
| 9,066,037 | B2 | 6/2015 | Yoshizawa |
| 9,148,547 | B2 | 9/2015 | Kakutani |
| 9,189,716 | B2 | 11/2015 | Takahama et al. |
| 9,463,638 | B1 | 10/2016 | Kroon |
| 9,565,337 | B1 | 2/2017 | Kuo et al. |
| 9,573,382 | B1 | 2/2017 | Metcalfe |
| 9,641,726 | B1 | 5/2017 | Schweid et al. |
| 10,043,118 | B2 | 8/2018 | Sumi et al. |
| 10,277,775 | B2 | 4/2019 | Kirchhoff et al. |
| 10,298,812 | B2 | 5/2019 | Katsuyama et al. |
| 10,560,603 | B2 | 2/2020 | Haruta |
| 10,654,285 | B2 | 5/2020 | Hoshii et al. |
| 10,855,881 | B1 * | 12/2020 | Kailey ............... G06K 15/1881 |
| 11,397,881 | B2 | 7/2022 | Shimomura et al. |
| 11,436,455 | B2 | 9/2022 | Kawai et al. |
| 11,539,859 | B2 | 12/2022 | Nakatsuji et al. |
| 2022/0230031 | A1 | 7/2022 | Bartels |

FOREIGN PATENT DOCUMENTS

| | | | |
|---|---|---|---|
| JP | 5720151 | B2 | 5/2015 |
| JP | 6164972 | B2 | 7/2017 |
| JP | 2019125889 | A | 3/2019 |
| JP | 2019080278 | A | 5/2019 |
| JP | 6613597 | B2 | 12/2019 |
| JP | 6688468 | B2 | 4/2020 |
| JP | 7121357 | B2 | 8/2022 |

* cited by examiner

FIG. 7

| | 0 | 1 | 2 | 3 | 4 | 5 | 6 | 7 | ... | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| 5 | PV(5,0) | PV(5,1) | PV(5,2) | PV(5,3) | PV(5,4) | PV(5,5) | PV(5,6) | PV(5,7) | ... | PV(5,n) |
| 6 | PV(6,0) | PV(6,1) | PV(6,2) | PV(6,3) | PV(6,4) | PV(6,5) | PV(6,6) | PV(6,7) | ... | PV(6,n) |
| 7 | PV(7,0) | PV(7,1) | PV(7,2) | PV(7,3) | PV(7,4) | PV(7,5) | PV(7,6) | PV(7,7) | ... | PV(7,n) |
| ... | ... | ... | ... | ... | ... | ... | ... | ... | ... | ... |
| m | PV(m,0) | PV(m,1) | PV(m,2) | PV(m,3) | PV(m,4) | PV(m,5) | PV(m,6) | PV(m,7) | ... | PV(m,n) |

FIG. 8

| | 0 | 1 | 2 | 3 | 4 | 5 | 6 | 7 | ... | n |
|---|---|---|---|---|---|---|---|---|---|---|
| 0 | PV(0,0) | PV(0,1) | PV(0,2) | PV(0,3) | PV(0,4) | PV(0,5) | PV(0,6) | PV(0,7) | ... | PV(0,n) |
| 1 | PV(1,0) | PV(1,1) | PV(1,2) | PV(1,3) | PV(1,4) | PV(1,5) | PV(1,6) | PV(1,7) | ... | PV(1,n) |
| 2 | PV(2,0) | PV(2,1) | PV(2,2) | PV(2,3) | PV(2,4) | PV(2,5) | PV(2,6) | PV(2,7) | ... | PV(2,n) |
| 3 | PV(3,0) | PV(3,1) | PV(3,2) | PV(3,3) | PV(3,4) | PV(3,5) | PV(3,6) | PV(3,7) | ... | PV(3,n) |
| 4 | PV(4,0) | PV(4,1) | PV(4,2) | PV(4,3) | PV(4,4) | PV(4,5) | PV(4,6) | PV(4,7) | ... | PV(4,n) |
| 5 | PV(5,0) | PV(5,1) | PV(5,2) | PV(5,3) | PV(5,4) | PV(5,5) | PV(5,6) | PV(5,7) | ... | PV(5,n) |
| 6 | PV(6,0) | PV(6,1) | PV(6,2) | PV(6,3) | PV(6,4) | PV(6,5) | PV(6,6) | PV(6,7) | ... | PV(6,n) |
| 7 | PV(7,0) | PV(7,1) | PV(7,2) | PV(7,3) | PV(7,4) | PV(7,5) | PV(7,6) | PV(7,7) | ... | PV(7,n) |
| ... | ... | ... | ... | ... | ... | ... | ... | ... | ... | ... |
| m | PV(m,0) | PV(m,1) | PV(m,2) | PV(m,3) | PV(m,4) | PV(m,5) | PV(m,6) | PV(m,7) | ... | PV(m,n) |

|   | 0 | 1 | 2 | 3 | 4 | 5 | 6 | 7 | |
|---|---|---|---|---|---|---|---|---|---|
| 0 | HOB (0,0) | HOB (0,1) | HOB (0,2) | HOB (0,3) | HOB (0,4) | HOB (0,5) | HOB (0,6) | HOB (0,7) | ... |
| 1 | HOB (1,0) | HOB (1,1) | HOB (1,2) | HOB (1,3) | HOB (1,4) | HOB (1,5) | HOB (1,6) | HOB (1,7) | ... |
| 2 | HOB (2,0) | HOB (2,1) | HOB (2,2) | HOB (2,3) | HOB (2,4) | HOB (2,5) | HOB (2,6) | HOB (2,7) | ... |
| 3 | HOB (3,0) | HOB (3,1) | HOB (3,2) | HOB (3,3) | HOB (3,4) | HOB (3,5) | HOB (3,6) | HOB (3,7) | ... |
| 4 | HOB (4,0) | HOB (4,1) | HOB (4,2) | HOB (4,3) | HOB (4,4) | HOB (4,5) | HOB (4,6) | HOB (4,7) | ... |
| 5 | HOB (5,0) | HOB (5,1) | HOB (5,2) | HOB (5,3) | HOB (5,4) | HOB (5,5) | HOB (5,6) | HOB (5,7) | ... |
| 6 | HOB (6,0) | HOB (6,1) | HOB (6,2) | HOB (6,3) | HOB (6,4) | HOB (6,5) | HOB (6,6) | HOB (6,7) | ... |
| 7 | HOB (7,0) | HOB (7,1) | HOB (7,2) | HOB (7,3) | HOB (7,4) | HOB (7,5) | HOB (7,6) | HOB (7,7) | ... |
|   | ... | ... | ... | ... | ... | ... | ... | ... | ... |

| LUT 2150 | |
|---|---|
| INPUT VALUE 2702 | OUTPUT VALUE 2704 |
| 0000 | 0000 0000 |
| 0001 | 0000 0001 |
| 0010 | 0000 0100 |
| 0011 | 0000 0101 |
| 0100 | 0001 0000 |
| 0101 | 0001 0001 |
| 0110 | 0001 0100 |
| 0111 | 0001 0101 |
| 1000 | 0100 0000 |
| 1001 | 0100 0001 |
| 1010 | 0100 0100 |
| 1011 | 0100 0101 |
| 1100 | 0101 0000 |
| 1101 | 0101 0001 |
| 1110 | 0101 0100 |
| 1111 | 0101 0101 |

VECTORIZED INTERLEAVE OF BIT PLANES

TECHNICAL FIELD

This disclosure relates to the field of image formation, and more particularly, to processing of bit planes.

BACKGROUND

An image forming apparatus or other systems may process or generate bit planes. A bit plane is a slice of bits corresponding to a given bit position. For example, if an array of pixels is defined by two-bit data, then the array may be divided into two individual bit planes each corresponding to a bit position of the two-bit data (e.g., a first bit plane for bit position "0", and a second bit plane for bit position "1"). One example of generating bit planes may occur in halftoning, which is a technique for simulating a continuous tone image on a two-dimensional medium with a pattern of dots varying in size and/or spacing. A multi-level or multi-bit halftoning technique may be used to produce a halftoned image with pixel values defined by multiple bits (e.g., two-bits, three-bits, etc.). The multi-bit pixel values may be represented in individual bit planes for each bit position.

Downstream systems or devices may process data in bit field format as opposed to bit plane format. In bit field format, pixel values are represented by adjacent or contiguous bits in a bit field data structure. It may therefore be beneficial to transform data in bit plane format to bit field format. Unfortunately, some transformation processes from bit plane format to bit field format may be computationally expensive.

SUMMARY

Provided herein are a bit plane converter and associated method. As an overview, a bit plane converter as described herein is able to convert or transform a low-order bit plane and a higher-order bit plane into bit field format. The bit plane converter operates on low nibbles of the low-order bit plane and low nibbles of the higher-order bit plane using a lookup table (LUT) to generate bitwise-interleaved low nibbles. The bit plane converter operates on high nibbles of the low-order bit plane and high nibbles of the higher-order bit plane using the lookup table to generate bitwise-interleaved high nibbles. The bit plane converter then interleaves bytes of the bitwise-interleaved low nibbles with bytes of the bitwise-interleaved high nibbles to generate an interleaved vector where the higher-order bits are interleaved with the low-order bits. The interleaved vector represents a bit field format where pixel values, for example, are represented by adjacent or contiguous bits. One technical benefit is that the interleave process as described herein is more computationally efficient than conventional approaches.

In an embodiment, a bit plane converter comprises at least one processor, and a memory including computer program code executable by the processor. The processor causes the bit plane converter at least to receive a first bit plane comprising low-order bits for an array of pixels, and a second bit plane comprising higher-order bits for the pixels, and perform an interleave process on the pixels to generate bit fields for the pixels. The interleave process comprises processing low nibbles of a low-order word of the low-order bits and the low nibbles of a higher-order word of the higher-order bits using at least one lookup table to generate a bitwise interleaved low nibble vector, processing high nibbles of the low-order word and the high nibbles of the higher-order word using the at least one lookup table to generate a bitwise interleaved high nibble vector, and interleaving bytes of the bitwise interleaved low nibble vector with bytes of the bitwise interleaved high nibble vector to generate a bitwise interleaved vector comprising the bit fields.

In an embodiment, a method of converting bit planes into a bit field data structure comprises receiving a first bit plane comprising low-order bits for an array of pixels, and a second bit plane comprising higher-order bits for the pixels, and performing an interleave process on the pixels to generate bit fields for the pixels. The interleave process comprises processing low nibbles of a low-order word of the low-order bits and the low nibbles of a higher-order word of the higher-order bits using at least one lookup table to generate a bitwise interleaved low nibble vector, processing high nibbles of the low-order word and the high nibbles of the higher-order word using the at least one lookup table to generate a bitwise interleaved high nibble vector, and interleaving bytes of the bitwise interleaved low nibble vector with bytes of the bitwise interleaved high nibble vector to generate a bitwise interleaved vector comprising the bit fields.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 7 illustrates a raster image.

FIG. 8 illustrates a block of pixels in a raster image in an illustrative embodiment.

FIG. 15 illustrates computing of selector parameters in an illustrative embodiment.

FIGS. 16-17 illustrate bit planes that define pixel values for a halftoned image in an illustrative embodiment.

FIG. 18 illustrates a halftoned image with bit planes merged in an illustrative embodiment.

FIG. 27 illustrates a lookup table in an illustrative embodiment.

DETAILED DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
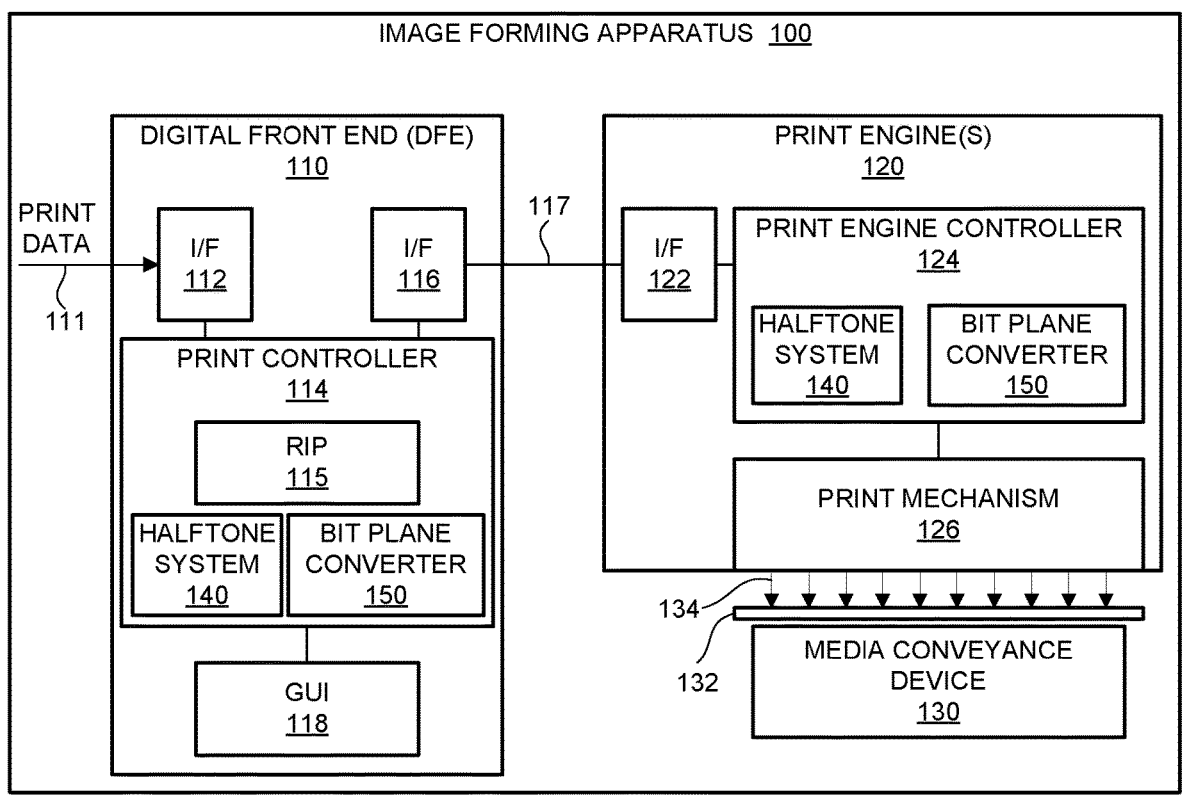
FIG. 1 is a schematic diagram of an image forming apparatus in an illustrative embodiment.

FIG. 1 is a schematic diagram of an image forming apparatus 100 in an illustrative embodiment. Image forming apparatus 100 is a type of device that executes an image forming process (e.g., printing) on a recording medium 132. Image forming apparatus 100 may comprise a continuous-form printer that prints on a web of continuous-form media, such as paper. Although a continuous-form printer is discussed, concepts described herein may also apply to alternative print systems, such as cut-sheet printers, wide format printers, 3D printers, etc.

In an embodiment, image forming apparatus 100 includes a Digital Front End (DFE) 110, one or more print engines 120, and a media conveyance device 130. DFE 110 comprises a device, circuitry, means, and/or other component configured to accept print data 111, and convert the print data 111 into a suitable format for print engine 120. DFE 110 includes an Input/Output (I/O) interface 112, a print controller 114, a print engine interface 116, and a Graphical User Interface (GUI) 118. I/O interface 112 comprises a device, circuitry, means, and/or other component configured to receive print data 111 from a source. For example, I/O interface 112 may receive the print data 111 from a host system (not shown), such as a personal computer, a server, etc., over a network connection, may receive print data 111 from an external memory, etc. Thus, I/O interface 112 may be considered a network interface in some embodiments. The print data 111 comprises a file, document, print job, etc., that is formatted with a Page Description Language (PDL), such as PostScript, Printer Command Language (PCL), Intelligent Printer Data Stream (IPDS), etc. Print controller 114 comprises a device, circuitry, means, and/or other component configured to transform the print data 111 into one or more digital images that may be used by print engine 120 to mark the recording medium 132 with ink, toner, or another recording or marking material. In an embodiment, print controller 114 includes a Raster Image Processor (RIP) 115 that rasterizes the print data 111 to generate digital images. A digital image comprises a two-dimensional array of pixels. Whereas the print data 111 in PDL format is a high-level description of the content (e.g., text, graphics, pictures, etc.), a digital image defines a pixel value or color value for each pixel in a display space. Print engine interface 116 comprises a device, circuitry, means, and/or other component configured to communicate with print engine 120, such as to transmit digital images to print engine 120. Print engine interface 116 is communicatively coupled to print engine 120 via a communication link 117 (e.g., a fiber link, a bus, etc.), and is configured to use a data transfer protocol to transfer the digital images to print engine 120. GUI 118 is a hardware component configured to interact with a human operator. GUI 118 may include a display, screen, touch screen, or the like (e.g., a Liquid Crystal Display (LCD), a Light Emitting Diode (LED) display, etc.). GUI 118 may include a keyboard or keypad, a tracking device (e.g., a trackball or trackpad), a speaker, a microphone, etc. A human operator may access GUI 118 to view status indicators, view or manipulate settings, schedule print jobs, etc.

Print engine 120 includes a DFE interface 122, a print engine controller 124, and a print mechanism 126. DFE interface 122 comprises a device, circuitry, means, and/or other component configured to interact with DFE 110, such as to receive digital images from DFE 110. Print engine controller 124 comprises a device, circuitry, means, and/or other component configured to process the digital images received from DFE 110, and provide control signals to print mechanism 126. Print mechanism 126 is a device or devices that mark the recording medium 132 with a recording material 134, such as ink. Print mechanism 126 is configured for variable droplet or dot size to reproduce multiple intensity levels, as opposed to a bi-level mechanism where a pixel is either "on" or "off". For example, if print mechanism 126 is an ink-jet device, then multiple intensity levels per pixel may be achieved by printing one, two, or several droplets at the same position or pixel area, or varying the size of a droplet. Recording medium 132 comprises any type of material suitable for printing upon which recording material 134 is applied, such as paper (web or cut-sheet), plastic, card stock, transparent sheets, a substrate for 3D printing, cloth, etc. In an embodiment, print mechanism 126 may include one or more printheads that are configured to jet or eject droplets of a print fluid, such as ink (e.g., water, solvent, oil, or UV-curable), through a plurality of orifices or nozzles. The orifices or nozzles may be grouped according to ink types (e.g., colors such as Cyan (C), Magenta (M), Yellow (Y), Key black (K) or formulas such as for pre-coat, image and protector coat), which may be referred to as color planes. In another embodiment, print mechanism 126 may include a drum that selectively collects electrically-charged powdered ink (toner), and transfers the toner to recording medium 132. Media conveyance device 130 is configured to move recording medium 132 relative to print mechanism 126. In other embodiments, portions of print mechanism 126 may be configured to move relative to recording medium 132. Image forming apparatus 100 may include various other components not specifically illustrated in FIG. 1.

In an embodiment, when RIP 115 rasterizes the print data 111, the output is a digital continuous tone image (i.e., contone image) where individual pixels are defined with pixel values that are a relatively large number of bits. For example, the digital continuous tone image may have 8-bit pixel values or larger. A digital continuous tone image generated by RIP 115 is referred to herein as a "raster image". An 8-bit pixel value may represent 256 different intensities of a color. However, a typical print mechanism (e.g., print mechanism 126) may not be capable of reproduction at 256 different levels. Thus, a halftoning process may be performed to define the individual pixels with lower multi-bit values, such as two-bits, three-bits, etc. FIG. 1 also illustrates a halftone system 140 implemented in print controller 114. Halftone system 140 comprises circuitry, logic, hardware, means, and/or other components configured to perform a multi-level halftoning process on one or more raster images, which is described in further detail below. Although halftone system 140 is shown as being implemented in print controller 114 of DFE 110, halftone system 140 may be implemented in print engine controller 124 (as shown in FIG. 1), in a host system or another system coupled to image forming apparatus 100, or in other systems.

Figure 2:
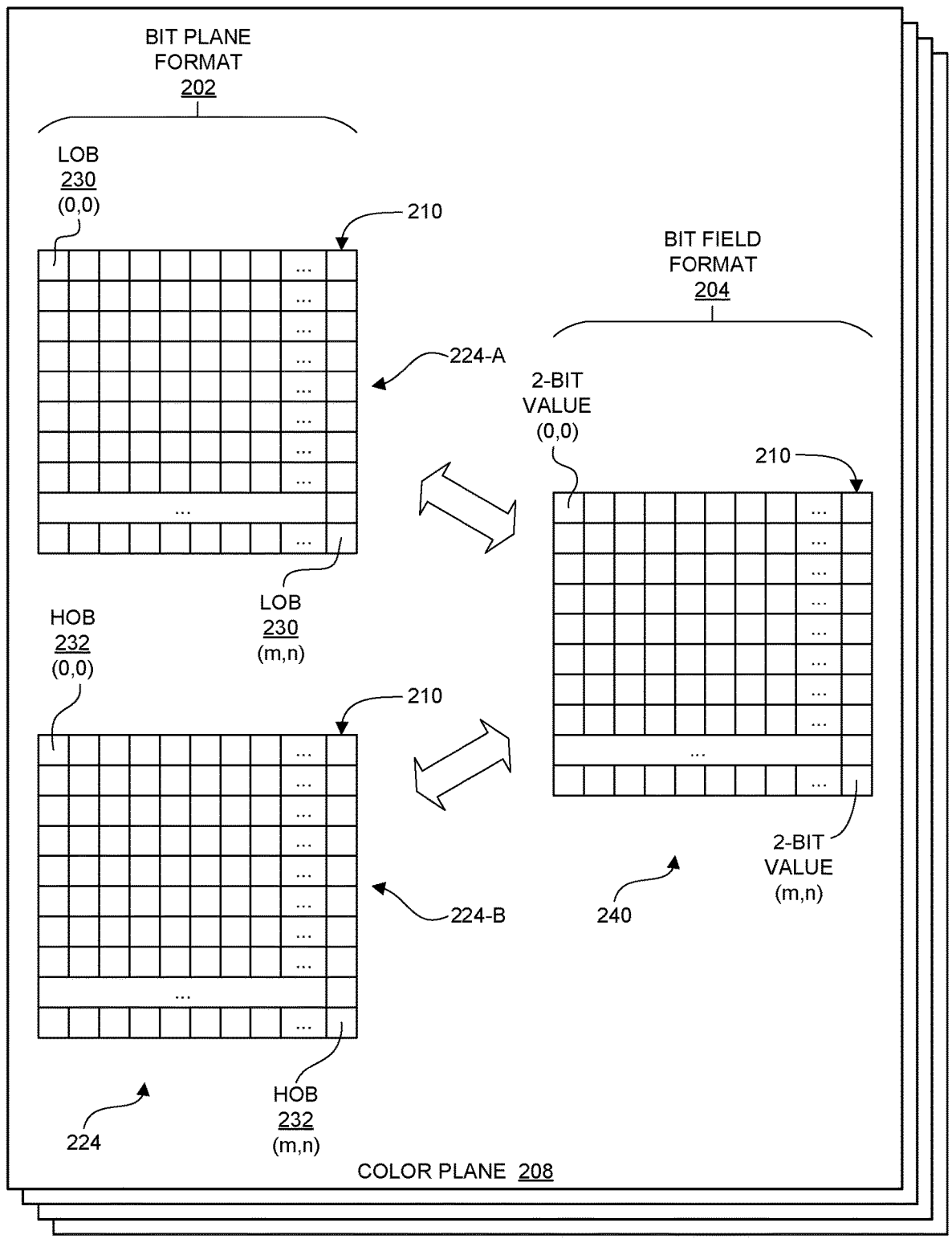
FIG. 2 illustrates data represented in bit plane format and bit field format in an illustrative embodiment.

In an embodiment, one or more components of image forming apparatus 100 may receive, process, and/or output bit planes. FIG. 2 illustrates data represented in bit plane format 202 and bit field format 204 in an illustrative embodiment. The data, in this example, may comprise an array of pixels 210 (or other data units). Each pixel 210 has a corresponding pixel position (e.g., "0,0"), and a 2-bit value representing an intensity level of the pixel 210. In bit plane format 202, the pixel values are represented by a pair of bit planes 224. For example, bit plane 224-A comprises the slice of low-order bits 230 (LOB) for the pixels 210 (also referred to as bit position "0"), and bit plane 224-B comprises the slice of higher-order bits 232 (HOB) for the pixels 210 (also referred to as bit position "1"). In bit field format 204, the pixel values are represented by adjacent or contiguous bits in a bit field data structure 240. In the example in FIG. 2, the pixel values are 2-bit values represented by two adjacent bits in the bit field data structure 240. The bit planes 224 and/or bit field data structure 240 are for pixels 210 of one color plane 208 (e.g., C, M, Y, K), and similar bit planes 224 and/or bit field data structure 240 are used for pixels 210 of other color planes 208. Although a two-bit example is shown in FIG. 2, N-bit values may be used to define intensity levels in other embodiments.

When bit planes 224 are generated, it may be desirable to convert the bit planes 224 to bit field format 204. For example, print engine 120 or print mechanism 126 may require bit fields rather than bit planes for image processing. FIG. 1 also illustrates a bit plane converter 150 implemented in print controller 114. Bit plane converter 150 comprises circuitry, logic, hardware, means, and/or other components configured to convert bit planes 224 to bit field format 204, which is described in further detail below. Although bit plane converter 150 is shown as being implemented in print controller 114 of DFE 110, bit plane converter 150 may be implemented in print engine controller 124 (as shown in FIG. 1), in a host system or another system coupled to image forming apparatus 100, or in other systems.

Figure 3:
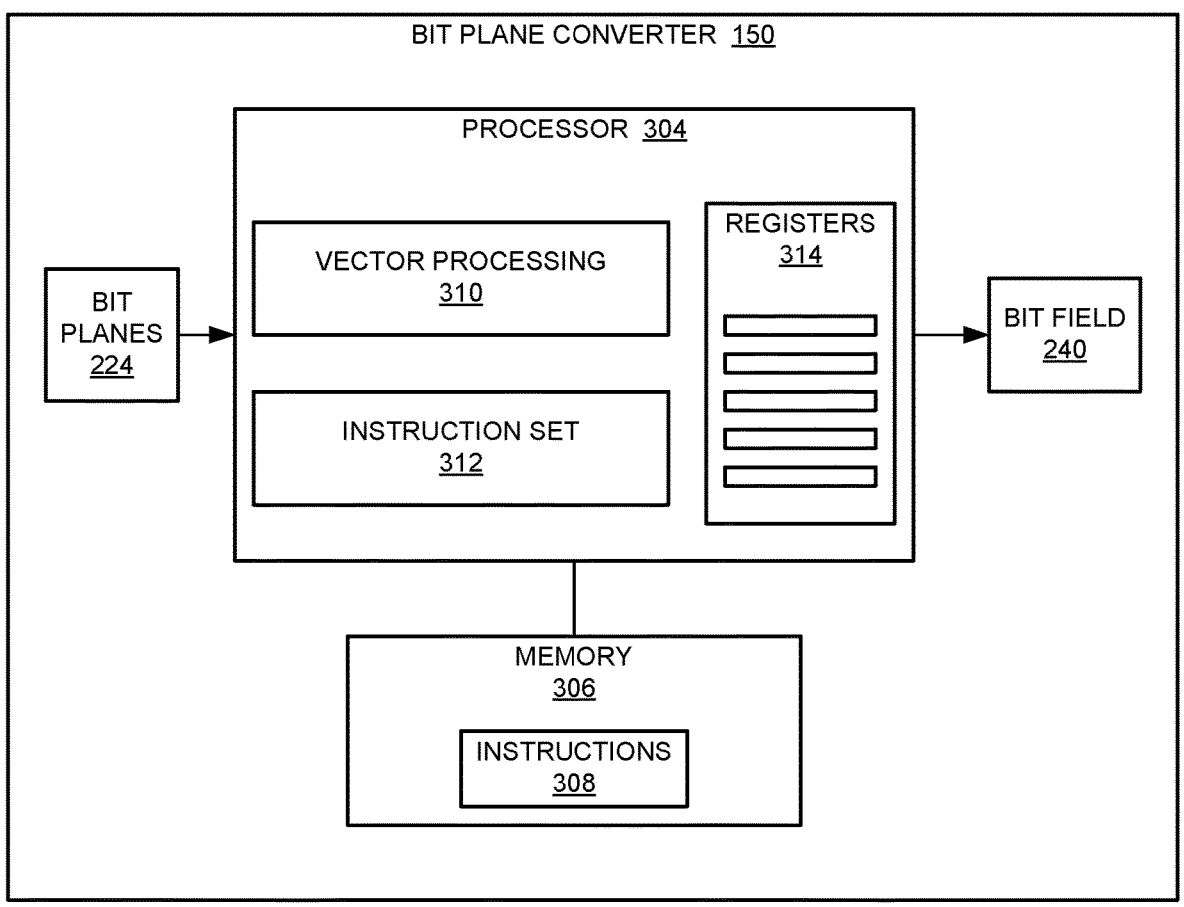
FIG. 3 is a schematic diagram of a bit plane converter in an illustrative embodiment.

FIG. 3 is a schematic diagram of bit plane converter 150 in an illustrative embodiment. Bit plane converter 150 includes one or more processors 304 and a memory 306. Processor 304 represents the internal circuitry, logic, hardware, etc., that provides the functions of bit plane converter 150. Processor 304 may be configured to execute instructions 308 (i.e., computer program code) for software that are loaded into memory 306. Processor 304 may comprise a set of one or more processors or may comprise a multi-processor core, depending on the particular implementation. Memory 306 is a computer readable storage medium for data, instructions 308, applications, etc., and is accessible by processor 304. Memory 306 is a hardware storage device capable of storing information on a temporary basis and/or a permanent basis. Memory 306 may comprise volatile or non-volatile Random-Access Memory (RAM), Read-Only Memory (ROM), FLASH devices, volatile or non-volatile Static RAM (SRAM) devices, magnetic disk drives, Solid State Disks (SSDs), or any other volatile or non-volatile storage device.

Bit plane converter 150 is configured to receive a plurality of bit planes 224 as input, and to convert or transform the bit planes 224 to a bit field data structure 240 (generally referred to as a bit field). In an embodiment, processor 304 is configured for vector processing 310. Vector processing 310 is a type of processing that operates on sets of values called "vectors" at a time, as compared to operating on a single value. Processor 304 operates according to an instruction set 312. For example, processor 304 may comprise an Intel® Xeon processor or the like that operates based on instruction set 312. Processor 304 further includes registers 314 configured to temporarily store data for operations performed according to instruction set 312. For example, registers 314 may be 64-bits wide, 128-bits wide, 256-bits wide, 512-bits wide, etc.

Figure 4A:
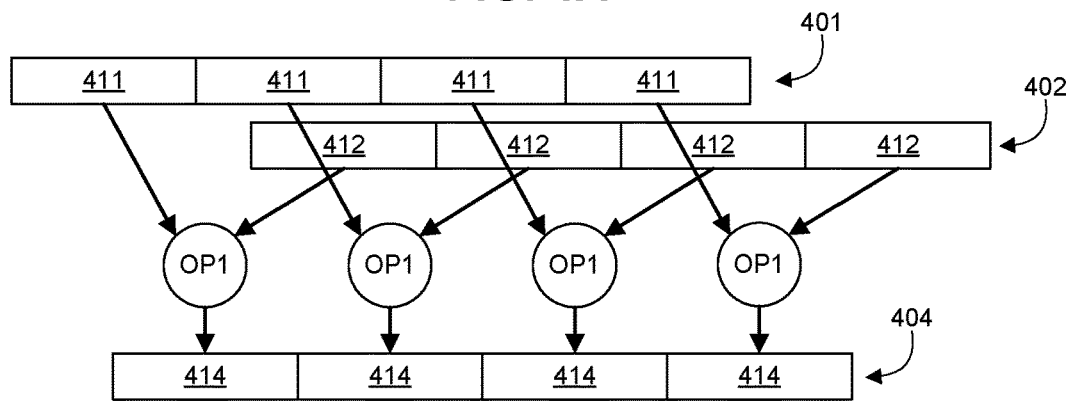
FIG. 4A illustrates a vector processing operation.

FIG. 4A illustrates a vector processing operation. Processor 304, for example, may receive two vectors 401-402 as input; each one with a set of one or more operands. Vector 401 includes a set of operands 411, and vector 402 includes a set of operands 412. Processor 304 is able to perform the same operation (OP1) on both sets of operands 411 and 412 (one operand from each vector) at a time, and output a vector 404 with the results 414. Processor 304 may have a variety of architectures that allow for vector processing 310, such as a Central Processing Unit (CPU) or a Graphics Processing Unit (GPU) that use either a Single Instruction Multiple Data (SIMD) paradigm or a Single Program Multiple Data (SPMD) paradigm. In a SIMD paradigm, a single instruction is executed in parallel on multiple data points, and in an SPMD paradigm, a single procedure, or sequence of instructions, is executed in parallel on multiple data points.

Figure 4B:
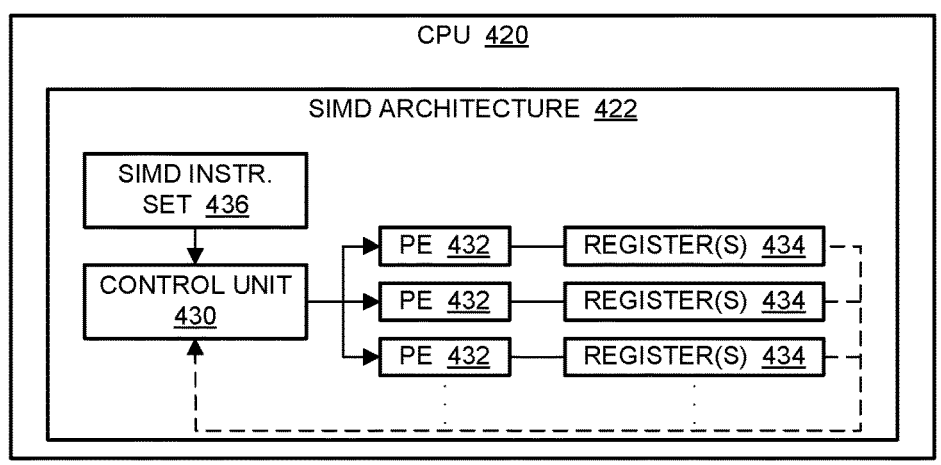
FIG. 4B illustrates a Central Processing Unit (CPU).
Figure 4C:
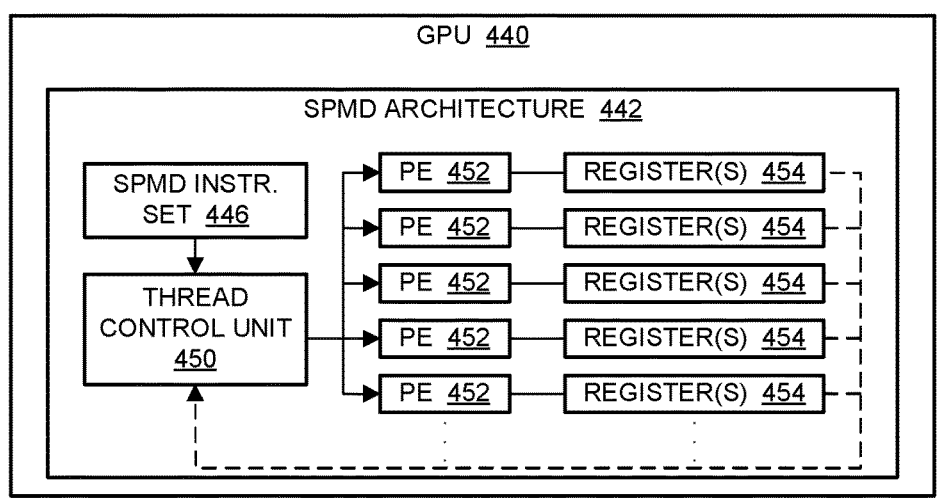
FIG. 4C illustrates a Graphics Processing Unit (GPU).

FIGS. 4B-4C illustrate a CPU 420 and a GPU 440, respectively, that perform SIMD or SPMD operations. In FIG. 4B, CPU 420 includes a SIMD architecture 422, which includes a control unit 430, and one or more processing clusters that include multiple processing elements (PE) 432 (e.g., Arithmetic Logic Units (ALUs)) and corresponding registers 434 (also referred to as memory modules (MM)). Although three processing elements 432 are illustrated in this example, more or less processing elements may be used in other examples. Control unit 430 is configured to fetch or retrieve a SIMD instruction set 436, and issue instructions to the PEs 432 from the instruction set 436 during one or more clock cycles. Control unit 430 is also configured to manage data fetching and data storage. PEs 432 represent the computational resources that perform operations based on instructions from control unit 430. Registers 434 are configured to temporarily store data for operations performed by PEs 432. For example, registers 434 may be 64-bits wide, 128-bits wide, 256-bits wide, 512-bits wide, etc. Control unit 430 may also manage processes for loading data into registers 434. In FIG. 4C, GPU 440 includes a SPMD architecture 442, which includes a thread control unit 450 that operates based on an SPMD instruction set 446, and one or more processing clusters that include multiple PEs 452 and corresponding registers 454. It is noted that FIGS. 4B-4C illustrate a basic structure of a CPU 420 and a GPU 440 for SIMD or SPMD operations, and other structures are considered herein.

Figure 5:
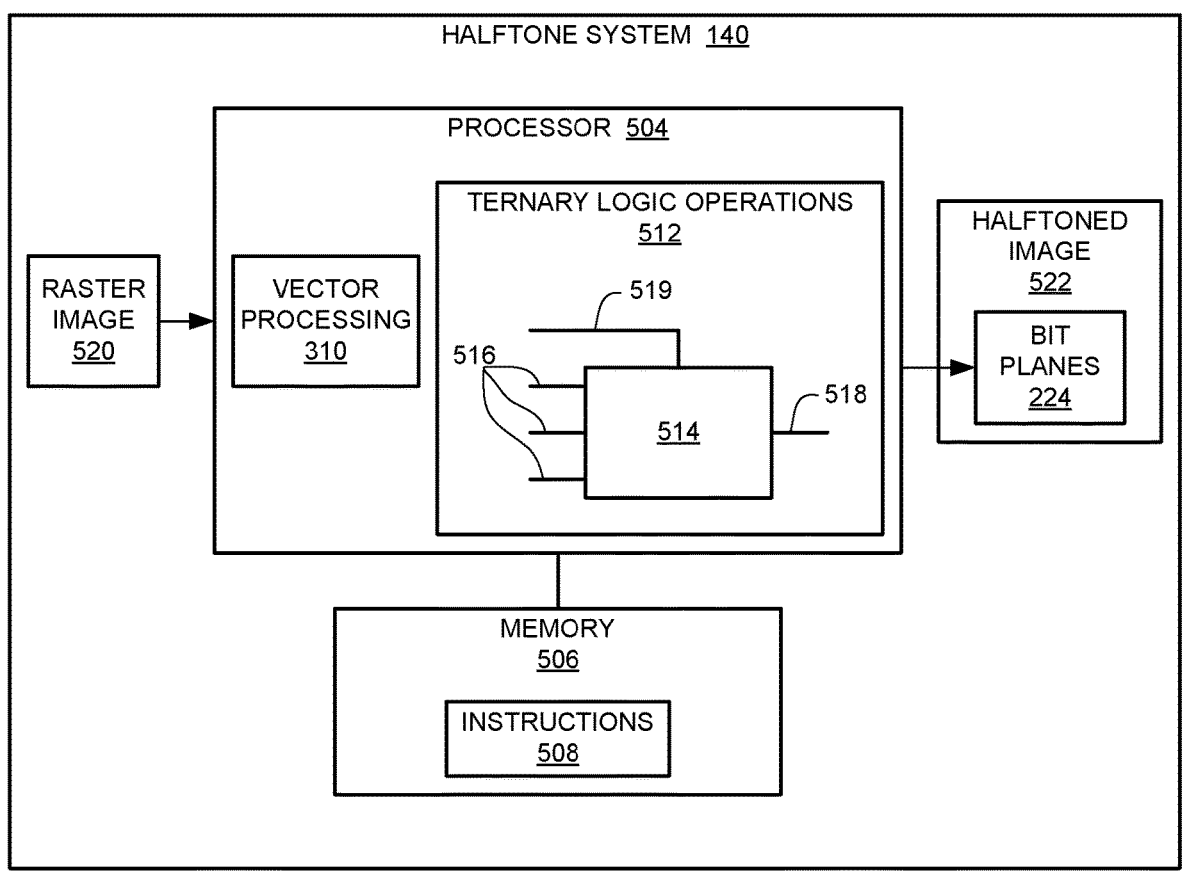
FIG. 5 is a schematic diagram of a halftone system in an illustrative embodiment.

In an embodiment, bit plane converter 150 may be used to convert or transform bits planes 224 generated by halftone system 140 into a bit field data structure 240. FIG. 5 is a schematic diagram of halftone system 140 in an illustrative embodiment. Halftone system 140 includes one or more processors 504 and a memory 506. Processor 504 represents the internal circuitry, logic, hardware, etc., that provides the functions of halftone system 140. Processor 504 may be configured to execute instructions 508 (i.e., computer program code) for software that are loaded into memory 506. Processor 504 is also configured for vector processing 310.

Processor 504 is also configured for ternary logic operations 512. Ternary logic is a function which maps three input Boolean values (or "bits") to a single output bit. Processor 504 may include a ternary logic subsystem 514 that includes three inputs 516 and one output 518. Ternary logic subsystem 514 may be configured to perform a plurality of ternary logic functions. For example, there may be 256 (28) possible ternary logic functions defined. To select between the ternary logic functions, ternary logic subsystem 514 further includes a selector parameter 519 (e.g., an 8-bit code) that is used to select a desired ternary logic function for a given set of inputs 516. CPU 420 and/or GPU 440 as discussed above may provide machine level instructions to implement ternary logic in this manner.

As a general overview of a multi-level halftoning process, halftone system 140 receives a raster image 520 (e.g., contone image) as input, and converts the raster image 520 to a multi-bit halftoned image 522 that indicates pixel values with fewer bits than the raster image 520. Halftone system 140 iterates over one or more blocks of pixels from the raster image 520 for a color plane 208 to compare sets of pixel values from the raster image 520 to thresholds that are defined to distinguish the different intensity levels. A comparison of a set of pixel values with threshold values, results in a corresponding set of comparison bits. Ternary logic operations 512 are then performed on the comparison bits to generate bit planes 224 for the pixels. Each bit plane 224 represents one of the bits for the pixels. For example, a first bit plane represents the low-order bits 230 of the pixels, a second bit plane represents higher-order bits 232 of the pixels, etc. The bit planes 224, in combination, represent the multi-bit halftoned image 222.

Figure 6A:
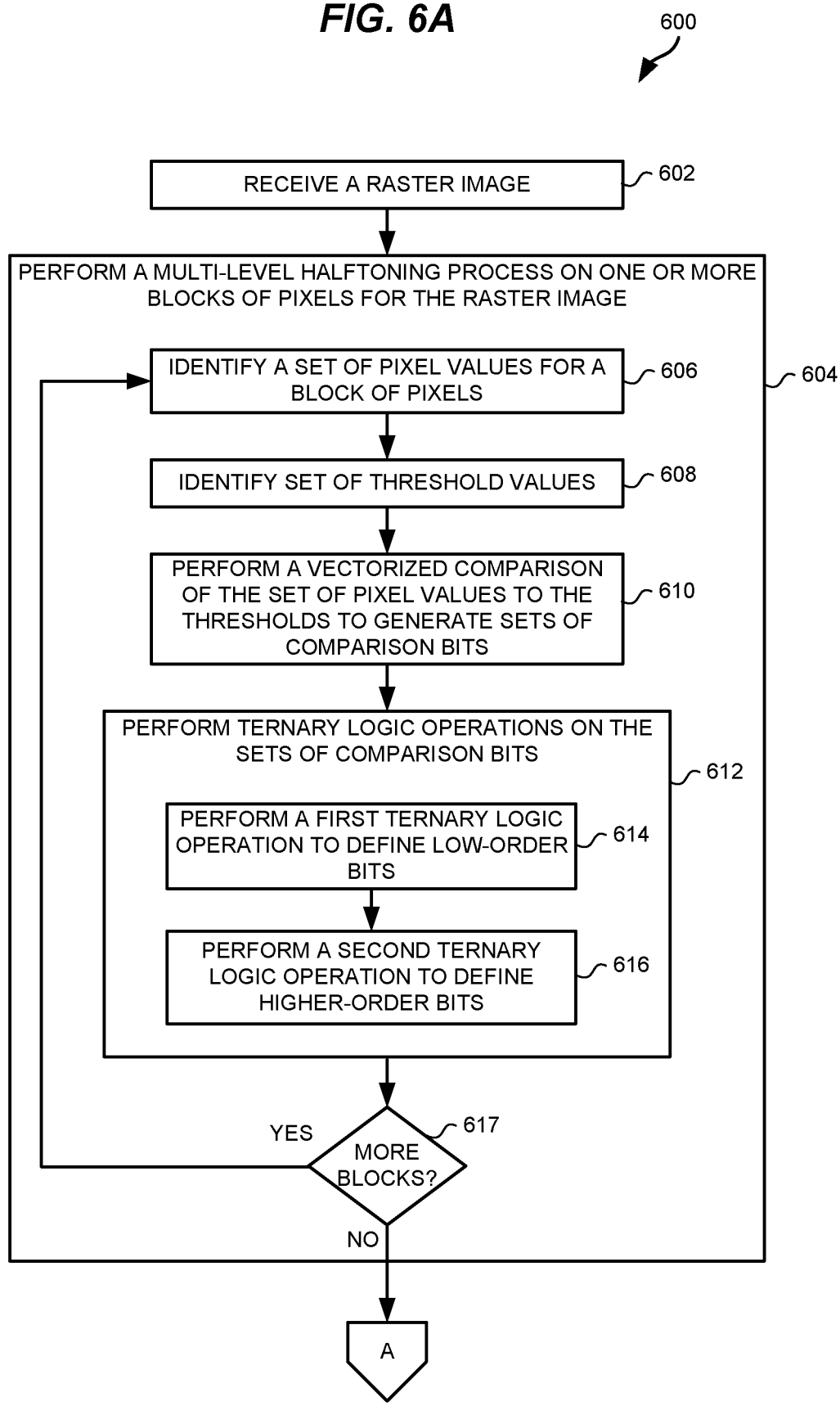
FIGS. 6A-6B depict a flowchart illustrating a method of halftoning in an illustrative embodiment.
Figure 6B:
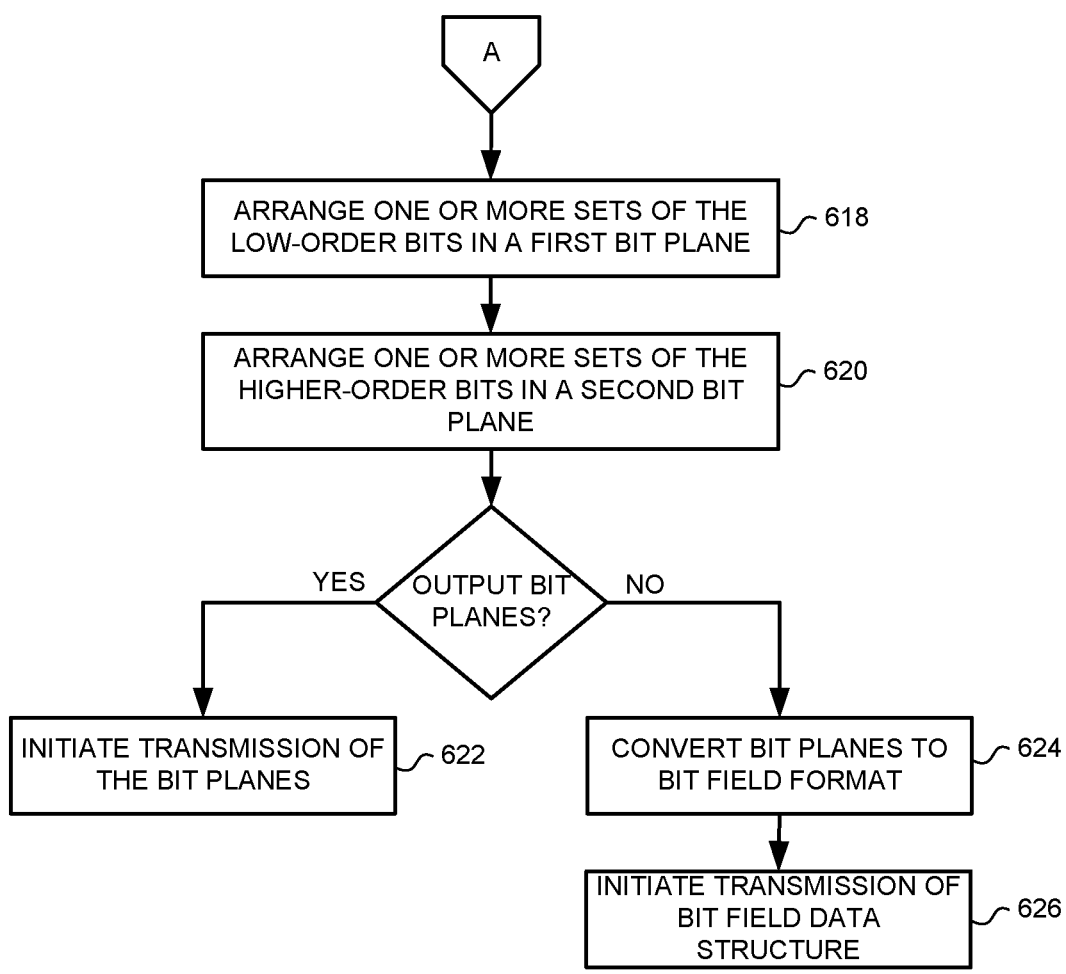

FIGS. 6A-6B depict a flowchart illustrating a method 600 of halftoning in an illustrative embodiment. The steps of method 600 are described with reference to halftone system 140 in FIG. 5, but those skilled in the art will appreciate that method 600 may be performed with other systems. The steps of the flowcharts described herein are not all inclusive and may include other steps not shown. The steps described herein may also be performed in an alternative order.

In FIG. 6A, processor 504 receives a raster image 520 (step 602) for a color plane 208, such as generated by RIP 115. FIG. 7 illustrates a raster image 520. Raster image 520 is a data structure that represents an array of pixels 210 with multi-bit pixel values (PV). The pixels are arranged in rows 710 and columns 711. There are "m+1" number of rows 710, and "n+1" number of columns 711. For illustrative purposes, each pixel 210 is noted with a (row,column) identifier (e.g., "0,0"). Each pixel 210 has an associated pixel value PV that is defined by x-bits, such as 8-bits, 16-bits, etc. For example, if the pixel values are 8-bit, then each pixel 210 may have any value between 0-255 (decimal). Raster image 520 is for a single color plane 208, such as C, M, Y, or K.

In FIG. 6A, processor 504 performs a multi-level halftoning process on pixels 210 for raster image 520 (step 604). A multi-level halftoning process produces output that defines pixel values in multiple bits, as opposed to a bi-level halftoning process. For example, a multi-level halftoning process may produce pixel values that are two-bits, three-bits, etc. For the multi-level halftoning process, halftone system 140 may operate on one or more blocks of pixels 210 at a time. Thus, processor 504 may identify a set of pixel values (PV) for pixels 210 in a block (step 606). A block of pixels 210 comprises a grouping or number of pixels that are processed at a time. A block may be a number of pixels consecutive in a row 710 of raster image 520, a number of pixels that wrap around from one row 710 to another, or another desired grouping of pixels. FIG. 8 illustrates a block 800 of pixels 210 in raster image 520 in an illustrative embodiment. In this example, block 800 includes eight pixels 210 in a single row. But as explained above, block 800 may have other numbers or groupings of pixels 210 in other examples. Processor 504 may load the set of pixel values for block 800 in a register, a local memory, or other memory location.

Processor 504 identifies a block of threshold values that correspond with the set of pixel values for block 800 (step 608). Multi-level reproduction involves multiple intensity levels, and therefore multiple thresholds that distinguish the different intensity levels. There is one less threshold than number of intensity levels. For example, a pixel 210 represented by two bits may have four intensity levels (e.g., "00", "01", "10", "11"). In this two-bit example with four intensity levels, there are three thresholds or threshold values that distinguish or divide the four intensity levels. Thus, processor 504 may identify first threshold values, a second threshold values, and a third threshold values from a threshold array, such as by retrieving the threshold array from memory 506. In a two-bit example with three intensity levels, there are two thresholds that distinguish or divide the three intensity levels. In a three-bit example with eight intensity levels, there may be seven thresholds that distinguish the eight intensity levels.

Figure 9:
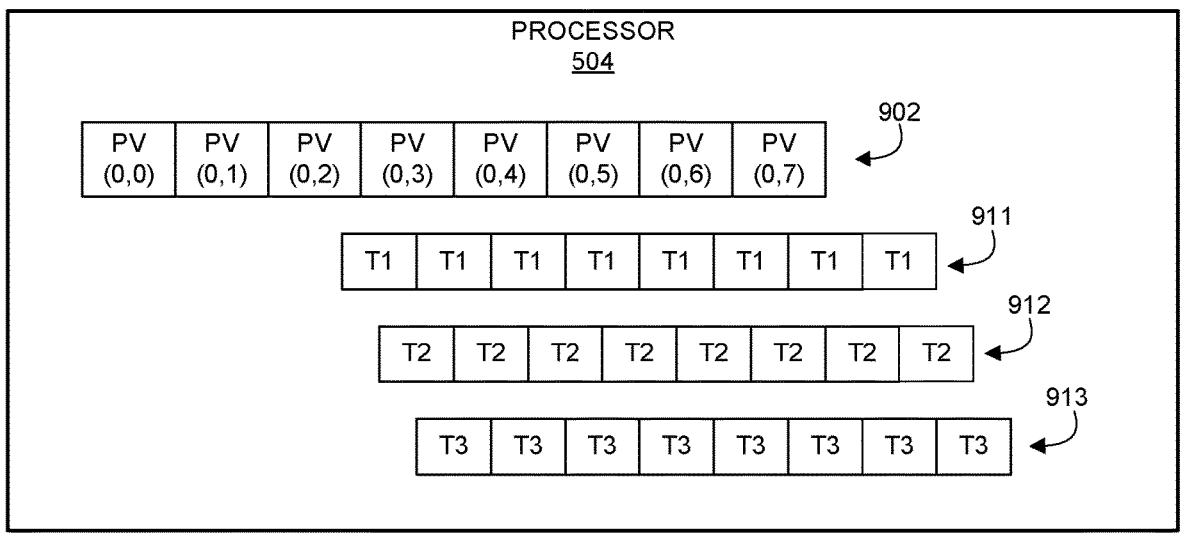
FIG. 9 is a schematic diagram of a processor with the set of pixel values for a block loaded in a local memory in an illustrative embodiment.
Figure 10:
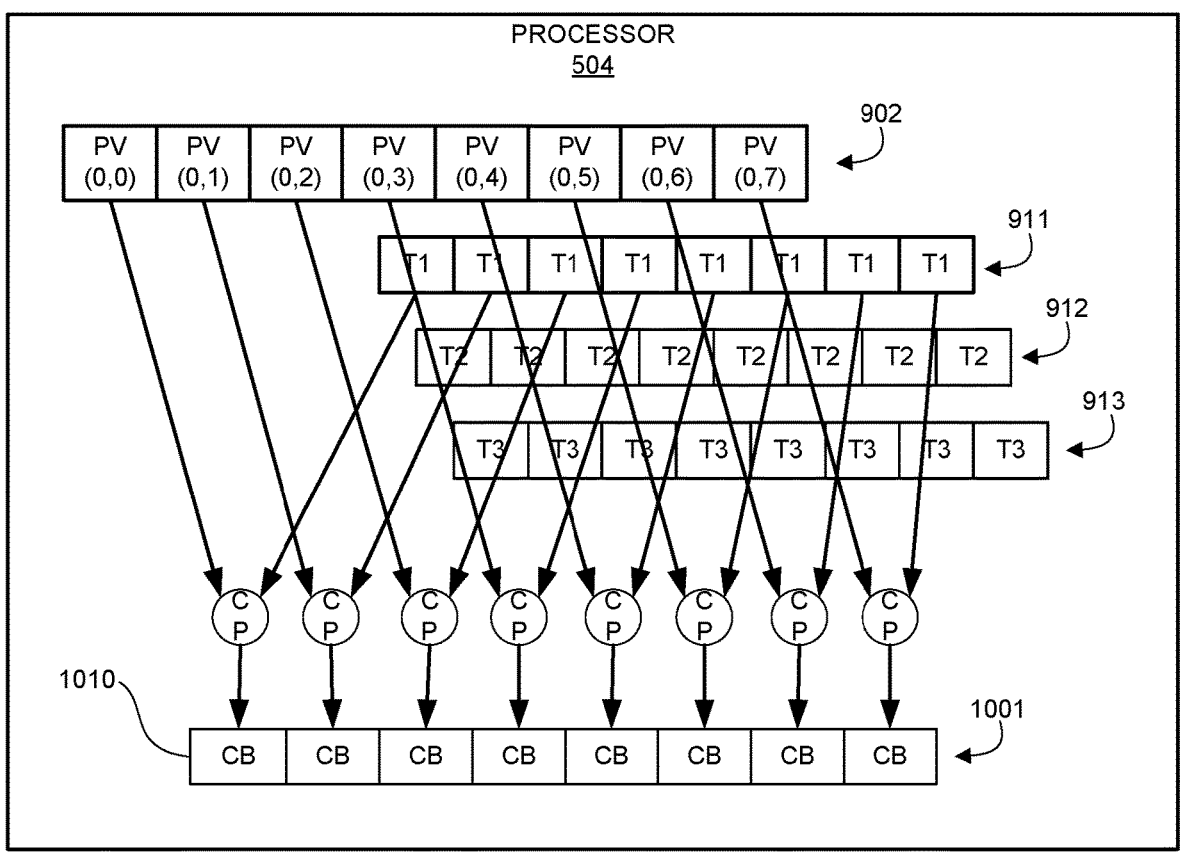
FIGS. 10-12 illustrate a vectorized comparison in an illustrative embodiment.
Figure 11:
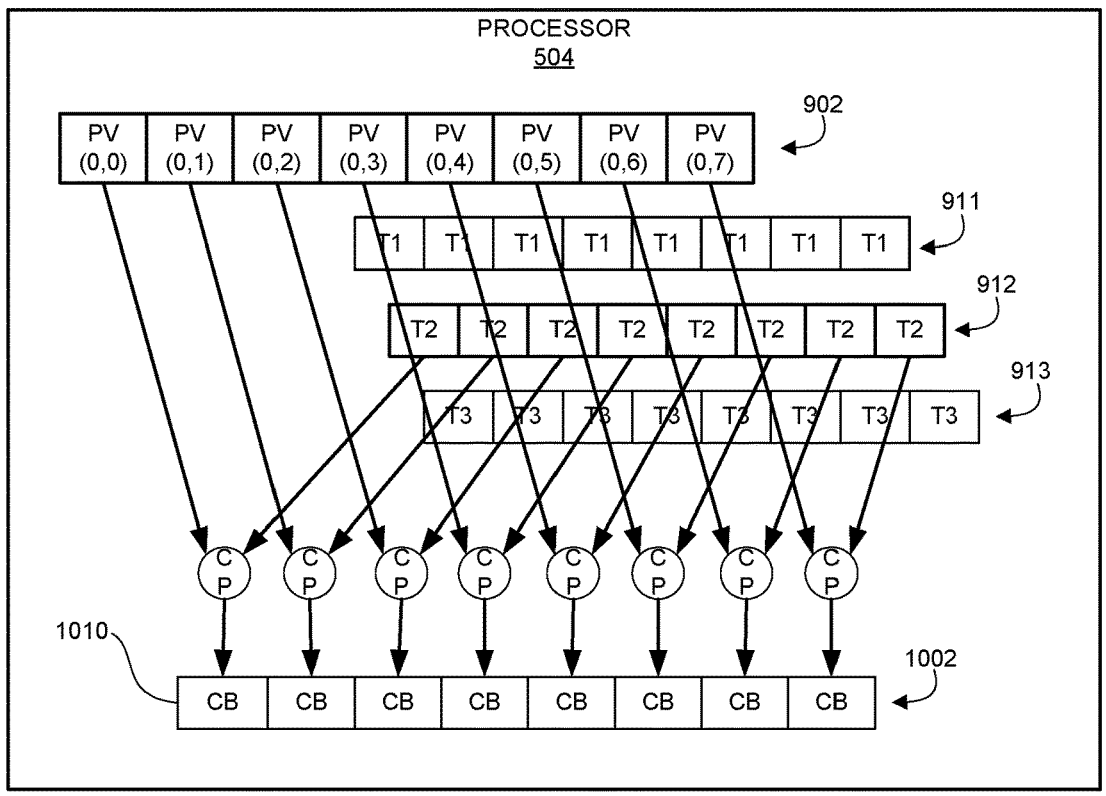
Figure 12:
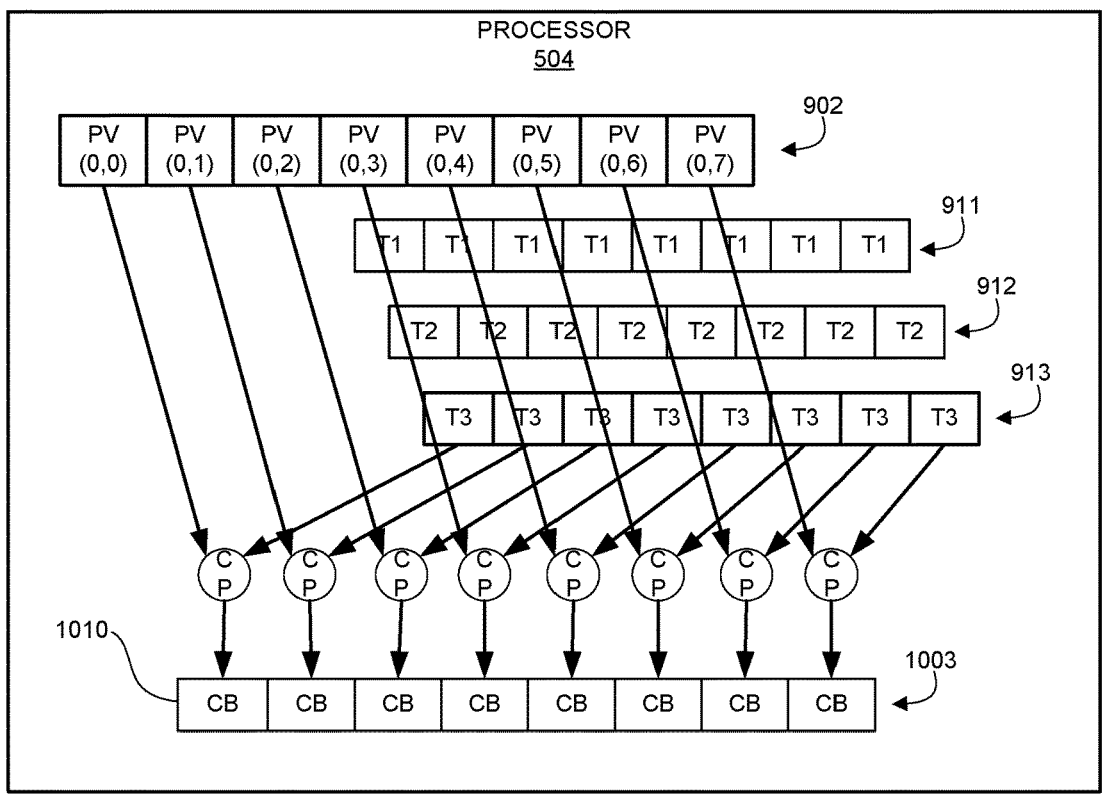

FIG. 9 is a schematic diagram of processor 504 with a set 902 of pixel values (PV) for block 800 loaded in a local memory in an illustrative embodiment. FIG. 9 further illustrates a set 911 of first threshold values (T1), a set 912 of second threshold values (T2), and a set 913 of third threshold values (T3) loaded in local memory. In this example, the set 911 of first threshold values (T1) is used to distinguish a first intensity level and a second intensity level. The set 912 of second threshold values (T2) is used to distinguish the second intensity level and a third intensity level. The set 913 of third threshold values (T3) is used to distinguish the third intensity level and a fourth intensity level. Additional sets of threshold values may be loaded into processor 504 in cases of more than four intensity levels. In FIG. 6A, processor 504 performs a vectorized comparison of the set 902 of pixel values (PV) to the threshold values, such as in sets 911-913 (step 610). A vectorized comparison means that the set 902 of pixel values (PV) is compared to a set 911-913 of threshold values at a time (e.g., a clock cycle). The set 902 of pixel values (PV) and a set 911-913 of threshold values may be considered "vectors" where the same comparison operation is performed on both sets of values (one from each vector) at a time. It is also noted that the set 902 of pixel values (PV) may be compared to each set 911-913 of threshold values simultaneously depending on the capability of processor 504. FIGS. 10-12 illustrate a vectorized comparison in an illustrative embodiment. In FIG. 10, processor 504 performs the vectorized comparison of the set 902 of pixel values (PV) to the set 911 of first threshold values to generate a first set 1001 of comparison bits (CB) 1010. A set of comparison bits represents the result of the comparison for each pixel value and threshold value. For example, if a pixel value is "220" and the threshold value is "64", then the comparison bit 1010 for that pixel may be "1". If the pixel value is "50" and the threshold value is "64", then the comparison bit 1010 for that pixel may be "0". In an embodiment, the first threshold values may be for a first or smallest droplet/dot size, which means that a pixel value that exceeds a first threshold value corresponds with at least the smallest droplet/dot size (i.e., the smallest droplet/dot size or a larger drop size).

In FIG. 11, processor 504 performs the vectorized comparison of the set 902 of pixel values (PV) to the set 912 of second threshold values to generate a second set 1002 of comparison bits (CB) 1010. In an embodiment, the second threshold values may be for a second droplet/dot size that is larger than the first droplet/dot size, meaning that a pixel value that exceeds a second threshold value corresponds with at least the second droplet/dot size (i.e., the second droplet/dot size or larger). In FIG. 12, processor 504 performs the vectorized comparison of the set 902 of pixel values (PV) to the set 913 of third threshold values to generate a third set 1003 of comparison bits (CB) 1010. In an embodiment, the third threshold values may be for a third droplet/dot size that is larger than the second droplet/dot size, meaning that a pixel value that exceeds a third threshold value corresponds with at least the third droplet/dot size (i.e., the third droplet/dot size or larger). Although the vectorized comparisons for the thresholds are shown in different figures, it is understood that the vectorized comparisons may be performed simultaneously within processor 504. Also, although vectorized comparisons are shown for three thresholds, processor 504 may perform vectorized comparisons for more or less thresholds depending on the number of intensity levels considered for the multi-level halftoning.

In FIG. 6A, the vectorized comparisons from step 610 result in multiple sets of comparison bits 1010 (e.g., sets 1001-1003). For multi-level halftoning, there are three or more sets of comparison bits whenever four or more output levels are used. Processor 504 performs ternary logic operations on the sets 1001-1003 of comparison bits 1010 (step 612). Ternary logic produces one output bit per three input bits. Thus, each one of the ternary logic operations outputs one bit of a pixel value for the halftoned image 522. For example, processor 504 may perform a first ternary logic operation (step 614) to define a low-order bit (least significant bit) of a pixel value, and a second ternary logic operation (step 616) to define the next higher-order bit of the pixel value. These ternary logic operations are performed to define the low-order bits 230 and the higher-order bits 232 for the pixels 210 in block 800.

Figure 13:
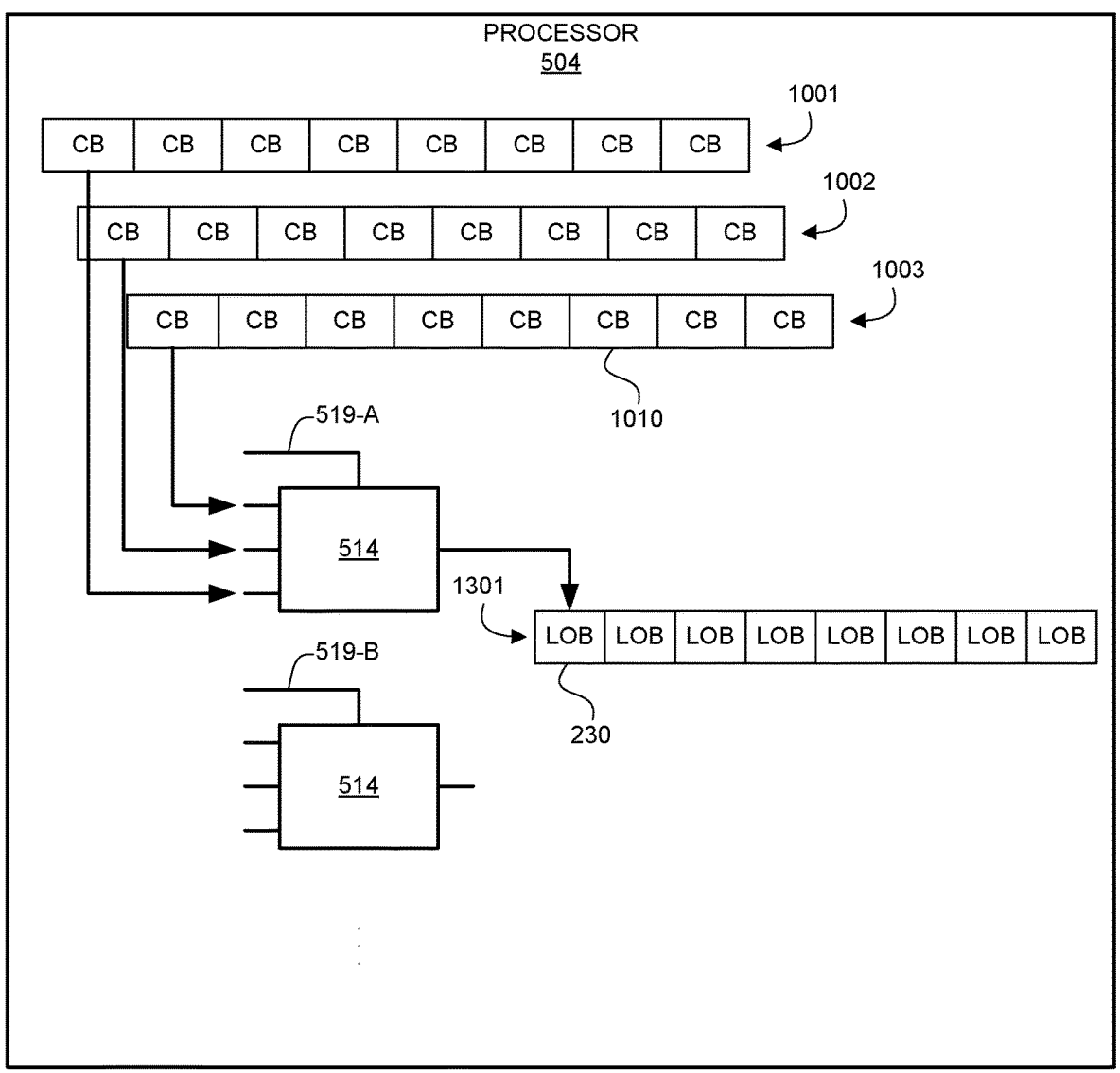
FIGS. 13-14 illustrate ternary logic operations in an illustrative embodiment.
Figure 14:
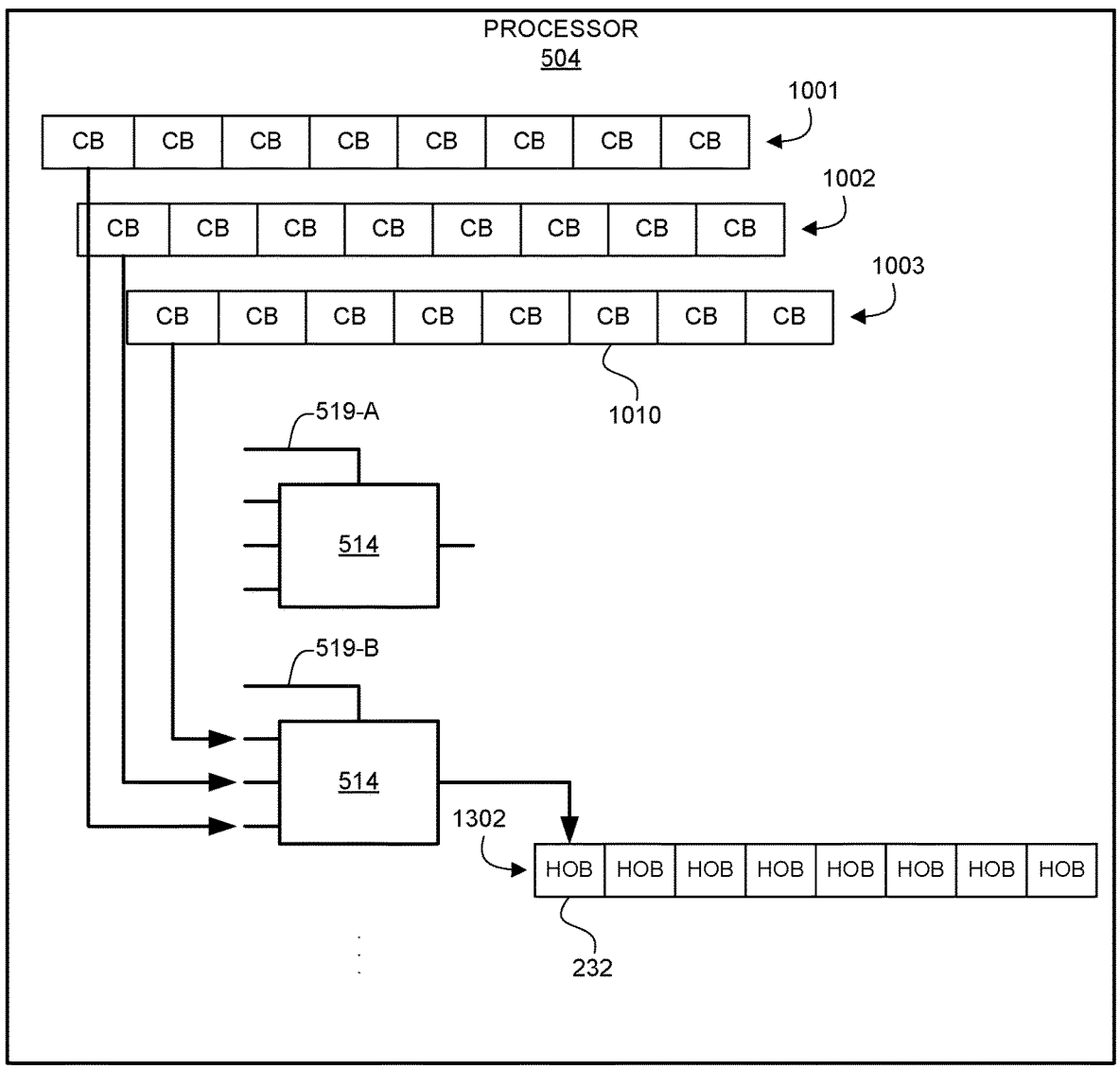

FIGS. 13-14 illustrate ternary logic operations in an illustrative embodiment. In FIG. 13, processor 504 performs a first ternary logic operation with the first set 1001 of comparison bits 1010, the second set 1002 of comparison bits 1010, and the third set 1003 of comparison bits 1010 as input. The first ternary logic operation outputs a set 1301 of low-order bits 230 (LOB) for the block 800 of the pixels 210. In FIG. 14, processor 504 performs a second ternary logic operation with the first set 1001 of comparison bits 1010, the second set 1002 of comparison bits 1010, and the third set 1003 of comparison bits 1010 as input. The second ternary logic operation outputs a set 1302 of higher-order bits 232 (HOB) for the block 800 of the pixels 210. For a two-bit halftoning process, the set 1302 of higher-order bits 232 represents the most-significant bits of the pixel values. Although not explicitly shown in FIGS. 13-14, processor 504 may perform a ternary logic operation on each of the comparison bits 1010 in sets 1001-1003 at the same time or simultaneously within processor 504 (e.g., same clock cycle).

Figures 15, 16:
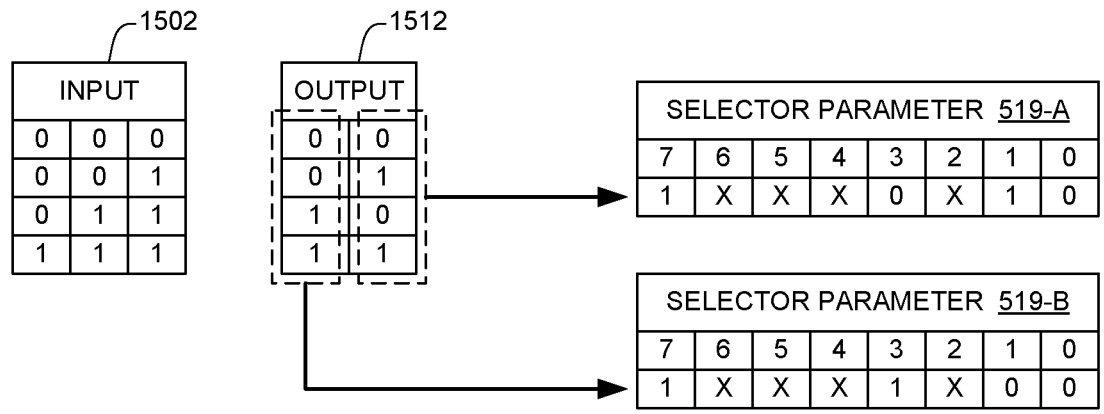

As stated above, there may be 256 possible ternary logic functions defined for ternary logic subsystems 514. The selector parameters 519-A/519-B are computed for ternary logic subsystems 514 to select the desired ternary logic functions for each bit plane 224. A selector parameter may be thought of as a lookup table. The three input bits form a number i between zero and seven. The $i^{th}$ bit of the selector parameter gives the output bit for the case of three input bits represented by i. FIG. 15 illustrates computing of selector parameters 519-A/519-B in an illustrative embodiment. The input table 1502 represents comparison bits 1010 arranged from right to left, such as from sets 1001-1003. The comparison bits 1010 resulting from the smallest threshold are on the right, and comparison bits 1010 resulting from the largest threshold are on the left. These bits are interpreted as a binary number between zero and seven. Not all numbers between zero and seven are needed for well-designed halftone threshold arrays, since the thresholds for smaller droplets/dots are always exceeded when the threshold for larger droplets/dots is exceeded. Accordingly, if there are four intensity levels, then the values that appear in input table 1502 are zero, one, three, and seven (i.e., "000", "001", "011", and "111"). Output table 1512 indicates the pixel value or pixel symbol desired when the input bits are as shown in input table 1502. For example, an input of "000" may be mapped to a pixel value of "00", an input of "001" may be mapped to a pixel value of "01", an input of "011" may be mapped to a pixel value of "10", and an input of "111" may be mapped to a pixel value of "11". However, any pixel value may be mapped to each possible set of input bits.

To compute a selector parameter 519-A for the first bit plane 224 (i.e., for the low-order bits), we use the rightmost column of the output table 1512. Selector parameter 519-A is an eight-bit value. According to the rightmost column, a value of "0" is mapped to an input of "000" (decimal value 0), so bit zero of the selector parameter 519-A is set to "0". A value of "1" is mapped to an input of "001" (decimal value 1), so bit one of the selector parameter 519-A is set to "1". A value of "0" is mapped to an input of "011" (decimal value 3), so bit three of the selector parameter 519-A is set to "0". A value of "1" is mapped to an input of "111" (decimal value 7), so bit seven of the selector parameter 519-A is set to "1". The other bits of the selector parameter 519-A are set to a "don't care" value ("X"). Since the corresponding input bit patterns do not occur in well-designed halftone threshold arrays, these values will have no effect on the halftoned image. They may be thought of as values that will appear in the case of an error in the threshold array.

To compute a selector parameter 519-B for the second bit plane 224 (i.e., for higher-order bits), we use leftmost column of the output table 1512. According to the leftmost column, a value of "0" is mapped to an input of "000" (decimal value 0), so bit zero of the selector parameter 519-B is set to "0". A value of "0" is mapped to an input of "001" (decimal value 1), so bit one of the selector parameter 519-B is set to "0". A value of "1" is mapped to an input of "011" (decimal value 3), so bit three of the selector parameter 519-B is set to "1". A value of "1" is mapped to an input of "111" (decimal value 7), so bit seven of the selector parameter 519-B is set to "1". The other bits of the selector parameter 519-B are set to a "don't care" value ("X").

The ternary logic operations output a set 1301 of low-order bits 230 for the block 800 of pixels 210, and a set 1302 of higher-order bits 232 for the block 800 of pixels 210. Processor 504 may repeat the multi-level halftoning process on multiple blocks of pixels 210 defined within raster image 520 in a similar manner. For example, if there is a determination (step 617) that the multi-level halftoning process is performed on additional blocks 800 of pixels 210, then method 600 returns to step 608 to identify a set of pixel values for another block 800 of pixels 210.

Processor 504 is configured to generate a plurality of bit planes 224 representing the pixel values for halftoned image 522. For example, a two-bit (four level) output includes two bit planes 224: one for the low-order bits 230, and one for the higher-order bits 232 of each pixel 210. In FIG. 6B, processor 504 arranges one or more sets 1301 of the low-order bits 230 in a first bit plane (step 618). The first bit plane therefore represents the low-order bits 230 for the pixels 210 of halftoned image 522. Processor 504 also arranges one or more sets 1302 of the higher-order bits 232 in a second bit plane (step 620). The second bit plane may therefore represent the next higher-order bits 232 for the pixels 210 of halftoned image 522. Processor 504 may arrange one or more additional bit planes 224 depending on the number of bits used to define pixels values in halftoned image 522.

FIGS. 16-17 illustrate bit planes that define pixel values for halftoned image 522 in an illustrative embodiment. FIG. 16 illustrates the first bit plane 224-A representing the low-order bits 230 (LOB) for one or more blocks of pixels 210. When processor 504 performs the first ternary logic operation (step 614), it generates a set 1301 of low-order bits 230 for a block 800 of pixels 210. Processor 504 arranges the set 1301 of low-order bits 230 in bit plane 224-A so that each of the low-order bits 230 defines part of a pixel value for its corresponding pixel 210. For example, set 1301 includes the low-order bits 230 for pixels (0,0), (0,1), (0,2), etc. The low-order bits 230 are illustrated as being arranged in rows and columns to depict how the low-order bits 230 correspond to pixels 210. However, a bit plane 224 may have any desired structure that maps low-order bits 230 to pixels 210. Processor 504 may arrange multiple sets 1301 of low-order bits 230 in bit plane 224-A for multiple blocks 800. Thus, bit plane 224-A may include the low-order bits 230 for pixels 210 corresponding with a portion of a sheetside, a logical page on an N-up sheetside, a full sheetside, etc. Typically, pages to be imaged are combined into physical "sheetsides" that consist of one or more logical pages of equal length which when laid out for printing, span the width of the print web. The sheetside represents the image to be printed on a side of a sheet (or equivalent) of recording medium 132. FIG. 17 illustrates the second bit plane 224-B representing the higher-order bits 232 (HOB) for one or more blocks of pixels 210. When processor 504 performs the second ternary logic operation (step 616), it generates a set 1302 of higher-order bits 232 for a block 800 of pixels 210. Processor 504 arranges the set 1302 of higher-order bits 232 in bit plane 224-B so that each of the higher-order bits 232 defines part of a pixel value for its corresponding pixel 210. For example, set 1302 includes higher-order bits 232 for pixels (0,0), (0,1), (0,2), etc. Processor 504 may arrange multiple sets 1302 of higher-order bits 232 in bit plane 224-B for multiple blocks 800. Thus, bit plane 224-B may include higher-order bits 232 for pixels corresponding with a portion of a sheetside, a logical page on an N-up sheetside, a full sheetside, etc. In one embodiment, each bit plane 224-A/224-B may include the bits of eight pixels in a byte.

Processor 504 may be configured to output bit planes 224 to print engine 120, print mechanism 126, or another subsystem. For example, print engine 120 may be configured to handle individual bit planes 224 for a printing operation. Thus, processor 504 may initiate transmission of the bit planes 224 (e.g., the first bit plane 224-A and the second bit plane 224-B) to a destination, such as print engine 120, print mechanism 126, or another subsystem (step 622). For example, when halftone system 140 is implemented in print controller 114 of DFE 110 (see FIG. 1), processor 504 may access print engine interface 116 to transmit the bit planes 224 over communication link 117 to print engine 120. Print engine 120 may then initiate printing operations based on the bit planes 224. When halftone system 140 is implemented in print engine controller 124 of print engine 120, processor 504 may transmit the bit planes 224 to print mechanism 126, or to another subsystem within print engine controller 124 for further processing.

Figure 18:
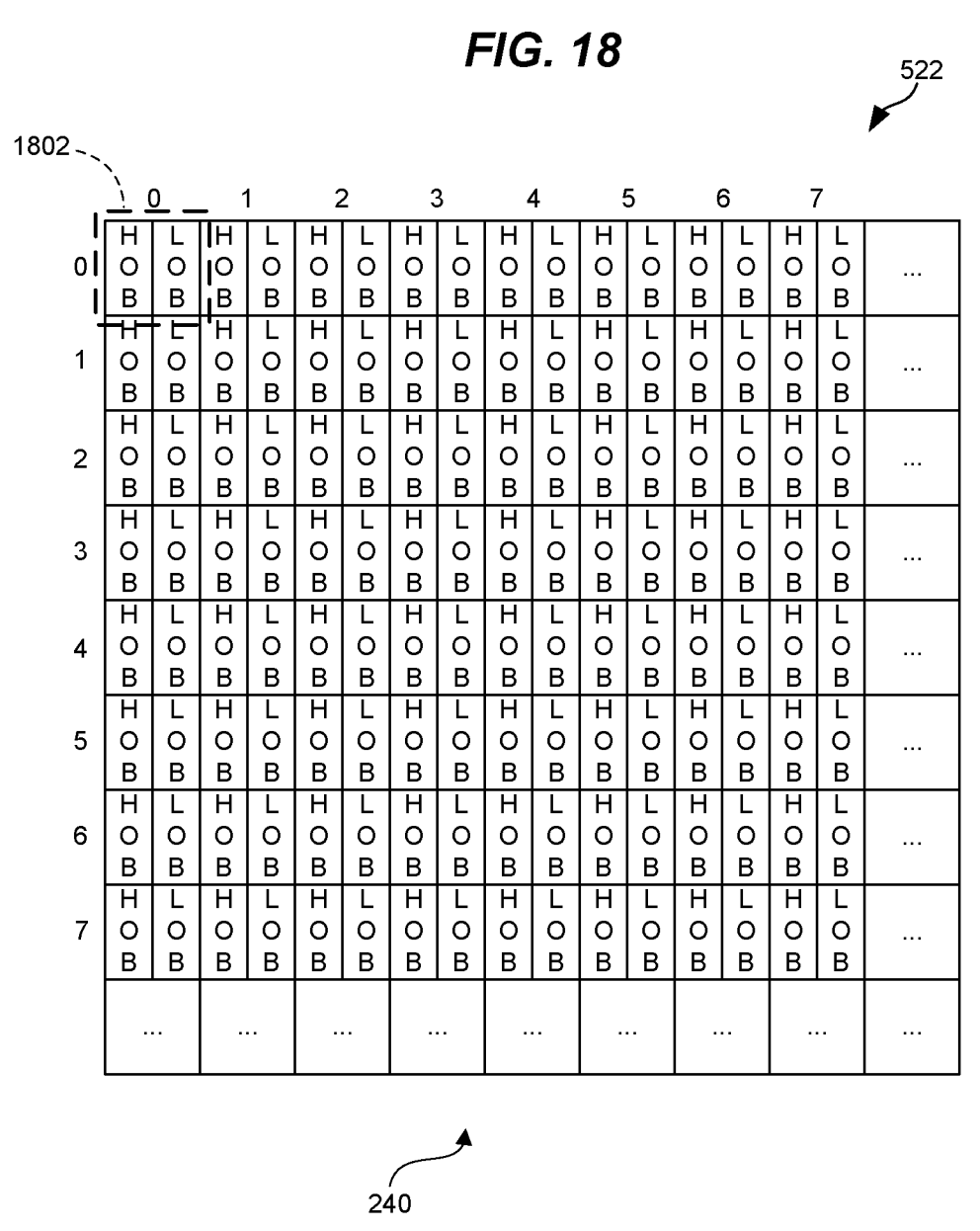

In another embodiment, print controller 114 and/or print engine controller 124 may be configured to output a bit field data structure 240. In this case, bit plane converter 150 may be implemented to convert or merge the bit planes 224 into a bit field data structure 240 of halftoned image 522 (step 624). FIG. 18 illustrates halftoned image 522 with bit planes 224-A/224-B merged in an illustrative embodiment. Halftoned image 522 of FIG. 18 comprises a bit field data structure 240 that represents an array of pixels 210 with pixel values (PV) in multi-bit bit fields 1802. The bit fields 1802 of halftoned image 522 are y-bit values, which are less than the x-bit values used in raster image 520. Bit plane converter 150 and/or halftone system 140 may then initiate transmission of the bit field data structure 240 in bit field format 204 to a destination, such as print engine 120, print mechanism 126, or another subsystem (step 626). For example, when bit plane converter 150 is implemented in print controller 114 of DFE 110 (see FIG. 1), bit plane converter 150 may access print engine interface 116 to transmit the bit field data structure 240 over communication link 117 to print engine 120. Print engine 120 may then initiate printing operations based on the bit field data structure 240. When bit plane converter 150 is implemented in print engine controller 124 of print engine 120, bit plane converter 150 may transmit the bit field data structure 240 to print mechanism 126, or to another subsystem within print engine controller 124 for further processing.

The multi-level halftoning process described above is performed for a raster image 520 of a single color plane 208. For a CMYK color model, for example, method 600 may be repeated to halftone raster images for each of the color planes 208. A conversion operation as described above may also be performed on bit planes 224 for multiple color planes 208.

Some of the examples provided above illustrate halftoning for four intensity levels. However, the concepts described herein apply to three intensity levels, five intensity levels, six intensity levels, or more. The case of three intensity levels is treated in a similar way as four intensity levels, except the third threshold values are set to zero. For the case of eight intensity levels, there are seven thresholds. The comparison bits 1010 resulting from a comparison of the pixel values and a first threshold value, a second threshold value, and a third threshold value may be input to a first ternary logic operation to output one bit plane 224. The comparison bits 1010 resulting from a comparison of the pixel values and a fifth threshold value, a sixth threshold value, and a seventh threshold value may be input to a second ternary logic operation to output another bit plane 224. The comparison bits 1010 resulting from a comparison of the pixel values and a fourth threshold value may be output to yet another bit plane 224 (e.g., the most significant bit). The comparison of the fourth threshold value may also be used to select which ternary logic result is written to the least significant bit plane. The cases of five to seven intensity levels may be treated the same as eight intensity levels, except that the unused thresholds are treated as if they were zero.

The following further describes operations of bit plane converter 150 for converting bit planes 224 into a bit field data structure 240. As mentioned above, bit plane converter 150 may be used in conjunction with halftone system 140 as discussed above to convert bit planes 224 into a bit field data structure 240. However, bit plane converter 150 may be used outside of or separate from halftone system 140 to convert bit planes 224 (i.e., generated from another system or application other than halftone system 140).

Figure 19:
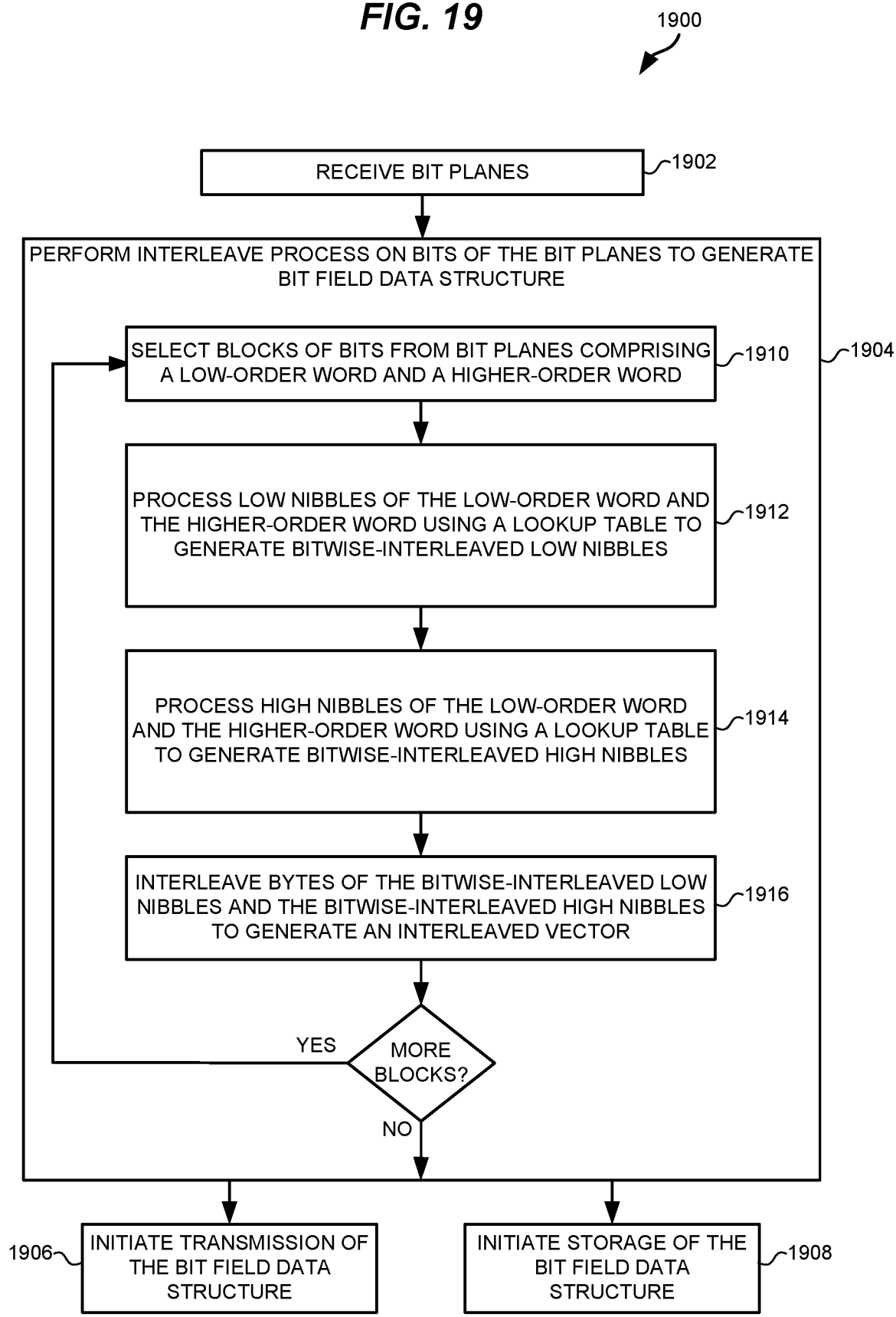
FIG. 19 is a flow chart illustrating a method of converting bit planes in an illustrative embodiment.

FIG. 19 is a flow chart illustrating a method 1900 of converting bit planes 224 in an illustrative embodiment. The steps of method 1900 are described with reference to bit plane converter 150 in FIG. 3, but those skilled in the art will appreciate that method 1900 may be performed with other systems.

Figure 20:
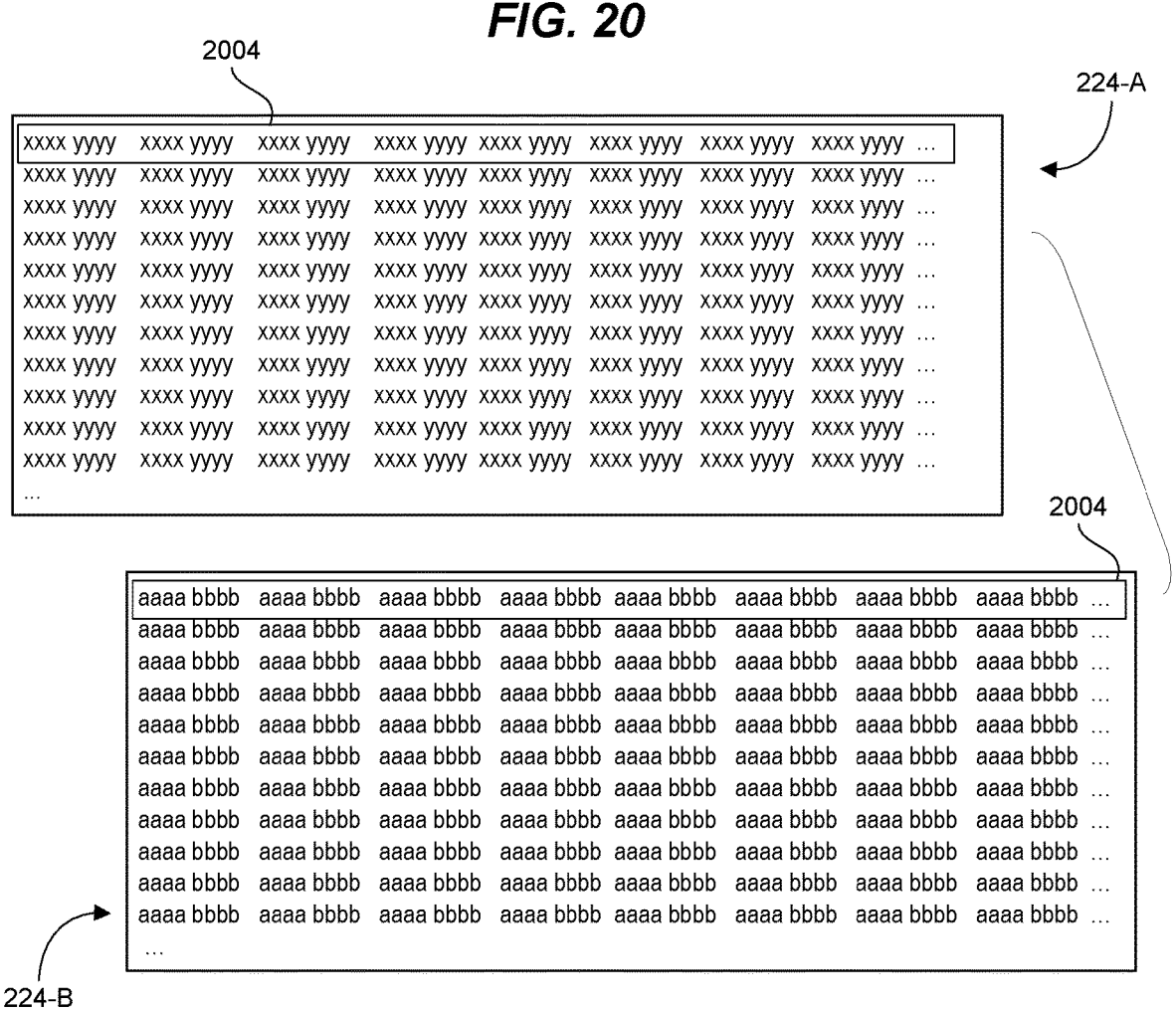
FIG. 20 illustrates a bit plane comprising low-order bits and a bit plane comprising higher-order bits in an illustrative embodiment.

Processor 304 of bit plane converter 150 receives bit planes 224 representing an array of pixels 210 (step 1902), or an array of other data units. More particularly, processor 304 receives a bit plane 224-A comprising low-order bits 230 for the array of pixels 210, and a bit plane 224-B comprising higher-order bits 232 for the pixels 210. FIG. 20 illustrates a bit plane 224-A comprising low-order bits 230 and a bit plane 224-B comprising higher-order bits 232 in an illustrative embodiment. A byte of low-order bits 230 is illustrated as "xxxx yyyy" in bit plane 224-A, and a byte of higher-order bits 232 is illustrated as "aaaa bbbb" in bit plane 224-B. Processor 304 then performs an interleave process on blocks 2004 of bits from the bit planes 224 to output or generate multi-bit values or bit fields 1802 for pixels 210 (step 1904 of FIG. 19). As shown in FIG. 20, processor 304 selects a block 2004 of bits from bit plane 224-A as a low-order word, and selects a corresponding block 2004 of bits from bit plane 224-B for the same set or block of pixels 210 as a higher-order word (step 1910), and performs the interleave process on the blocks 2004. For the interleave process, processor 304 processes low nibbles of the low-order bit plane 224-A and low nibbles of the higher-order bit plane 224-B using a lookup table (LUT) to generate bitwise-interleaved low nibbles where the low nibbles of the low-order word are bitwise interleaved with the low nibbles of the higher-order word. Processor 304 processes high nibbles of the low-order bit plane 224-A and high nibbles of the higher-order bit plane 224-B using the lookup table to generate bitwise-interleaved high nibbles where the high nibbles of the low-order word are bitwise interleaved with the high nibbles of the higher-order word. Processor 304 then interleaves bytes of the bitwise-interleaved low nibbles with bytes of the bitwise-interleaved high nibbles to generate an interleaved vector where the higher-order bits are interleaved with the low-order bits. The interleaved vector represents a bit field format where pixel values, for example, are represented by adjacent or contiguous bits. After interleaving is done for bit planes 224, a bit field data structure 240 is generated in bit field format 204. Processor 304 may therefore initiate transmission of the bit field data structure 240 (step 1906) and/or initiate storage of the bit field data structure 240 (step 1908).

Figure 22:
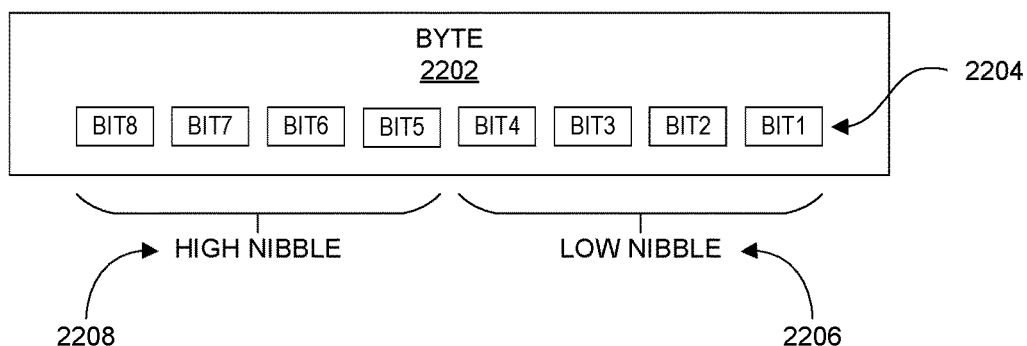
FIG. 22 illustrates a byte comprising a high nibble and a low nibble.
Figure 21:
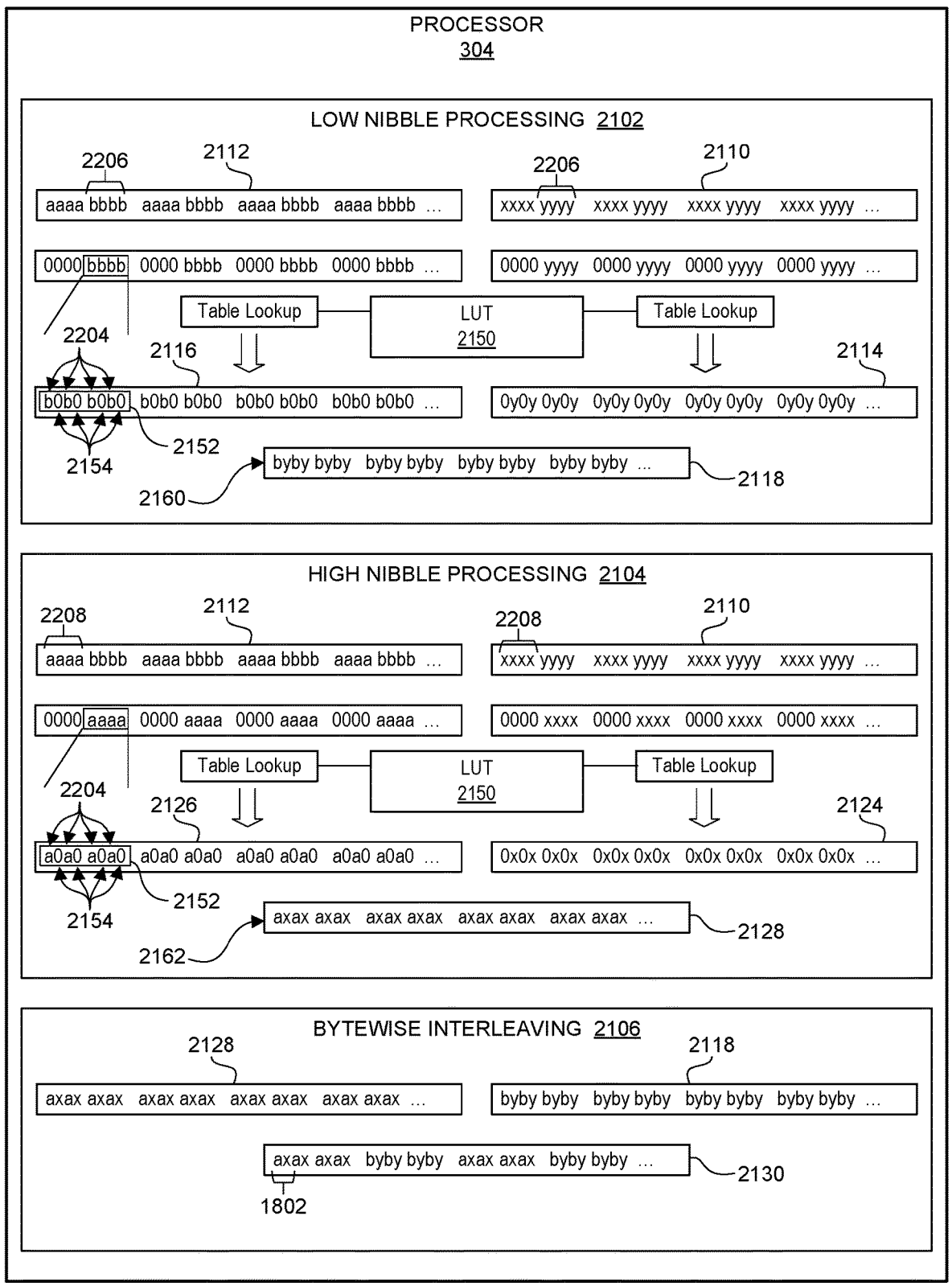
FIG. 21 is a schematic diagram illustrating an interleave process in an illustrative embodiment.

FIG. 21 is a schematic diagram illustrating an interleave process 2100 in an illustrative embodiment. In general, the interleave process 2100 comprises low nibble processing 2102, high nibble processing 2104, and bytewise interleaving 2106. A "nibble" as described herein is a half byte. FIG. 22 illustrates a byte 2202 comprising eight bits 2204. The low nibble 2206 of a byte 2202 denotes the less significant bits, and the high nibble 2208 of the byte 2202 denotes the more significant bits.

For the interleave process in FIG. 21, processor 304 of bit plane converter 150 may operate on blocks 2004 of bits from bit planes 224 at a time. Thus, processor 304 may identify or select a set of bits in a block 2004 from bit plane 224-A (i.e., the low-order bits 230) and a corresponding set of bits in a block 2004 from bit plane 224-B (i.e., the higher-order bits 232). The set of bits from the low-order bit plane 224-A is referred to as a low-order word 2110 (or first word), and the set of bits from the higher-order bit plane 224-B is referred to as a higher-order word 2112 (or second word). A word 2110/2112 comprises a grouping or number of consecutive bits in a bit plane 224 that are processed at a time. The size of words 2110/2112 may depend on the capabilities of processor 304. For example, the size of words 2110/2112 may be half a maximum operand size of processor 304, such as 128 bits, 256 bits, etc.

For low nibble processing 2102, processor 304 may zero out or mask the high nibbles 2208 of the low-order word 2110 and the higher-order word 2112. Processor 304 processes the low nibbles 2206 of the low-order word 2110 and the higher-order word 2112 using a lookup table (LUT) 2150 to generate bitwise-interleaved low nibbles 2160 (step 1912 of FIG. 19), also referred to as an interleaved low nibble vector 2118. In the (bitwise) interleaved low nibble vector 2118, the low nibbles 2206 of the low-order word 2110 are bitwise interleaved with the low nibbles 2206 of the higher-order word 2112 (e.g., "byby byby"). For example, the lookup table 2150 may map a nibble to an eight-bit output value 2152 comprising the bits 2204 of the nibble interleaved with extra zeros 2154. Processor 304 may use or implement the lookup table 2150 to map the low nibbles 2206 of the low-order word 2110 to eight-bit output values 2152 of a first low nibble intermediate vector 2114. Processor 304 may use or implement the lookup table 2150 (or another lookup table) to map the low nibbles 2206 of the higher-order word 2112 to eight-bit output values 2152 of a second low nibble intermediate vector 2116. Processor 304 may then perform a bitwise-OR of the first low nibble intermediate vector 2114 and the second low nibble intermediate vector 2116 to generate the interleaved low nibble vector 2118.

For the high nibble processing 2104, processor 304 may zero out or mask the low nibbles 2206 of the low-order word 2110 and the higher-order word 2112. Processor 304 processes the high nibbles 2208 of the low-order word 2110 and the higher-order word 2112 using a lookup table 2150 (i.e., the same or another/different lookup table) to generate bitwise-interleaved high nibbles 2162 (step 1914 of FIG. 19), also referred to as an interleaved high nibble vector 2128. In the (bitwise) interleaved high nibble vector 2128, the high nibbles 2208 of the low-order word 2110 are bitwise interleaved with the high nibbles 2208 of the higher-order word 2112 (e.g., "axax axax"). For example, processor 304 may use or implement the lookup table 2150 to map the high nibbles 2208 of the low-order word 2110 to eight-bit output values 2152 of a first high nibble intermediate vector 2124. Processor 304 may use or implement the lookup table 2150 (or another/different lookup table) to map the high nibbles 2208 of the higher-order word 2112 to eight-bit output values 2152 of a second high nibble intermediate vector 2126. Processor 304 may then perform a bitwise-OR of the first high nibble intermediate vector 2124 and the second high nibble intermediate vector 2126 to generate the interleaved high nibble vector 2128.

For the bytewise interleaving 2106, processor 304 interleaves bytes 2202 of the bitwise-interleaved low nibbles 2160 (i.e., interleaved low nibble vector 2118) with bytes 2202 of the bitwise-interleaved high nibbles 2162 (i.e., interleaved high nibble vector 2128) to generate an interleaved vector 2130 (step 1916 of FIG. 19). In the (bitwise) interleaved vector 2130, the higher-order bits of the higher-order word 2112 are bitwise interleaved with the low-order bits of the low-order word 2110. The interleaved vector 2130 therefore comprises multi-bit values or bit fields 1802 for the block of the pixels 210. Processor 304 may repeat the interleave process 2100 on multiple blocks of bits 2204 from the bit planes 224. The interleaved vectors 2130 resulting from the interleave process 2100 form the bit field data structure 240, where individual pixel values are represented by a bit field 1802 of two consecutive bits. One technical benefit is bit planes 224 may be efficiently transformed into bit field format 204 for storage and/or transmission to another system that processes received images in bit field format.

Figure 23A:
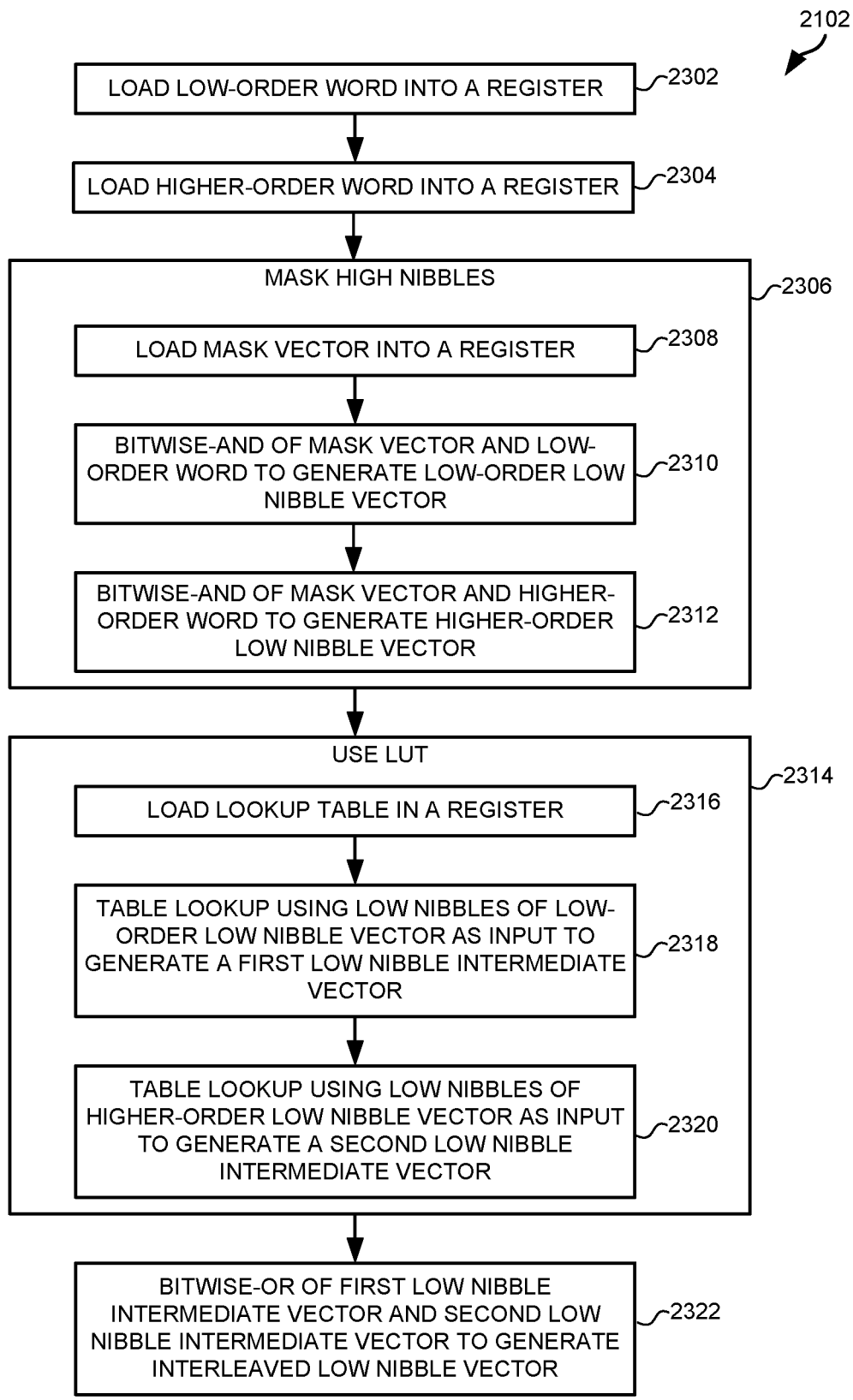
FIGS. 23A-23B are flow charts illustrating methods of performing an interleave process in an illustrative embodiment.
Figure 23B:
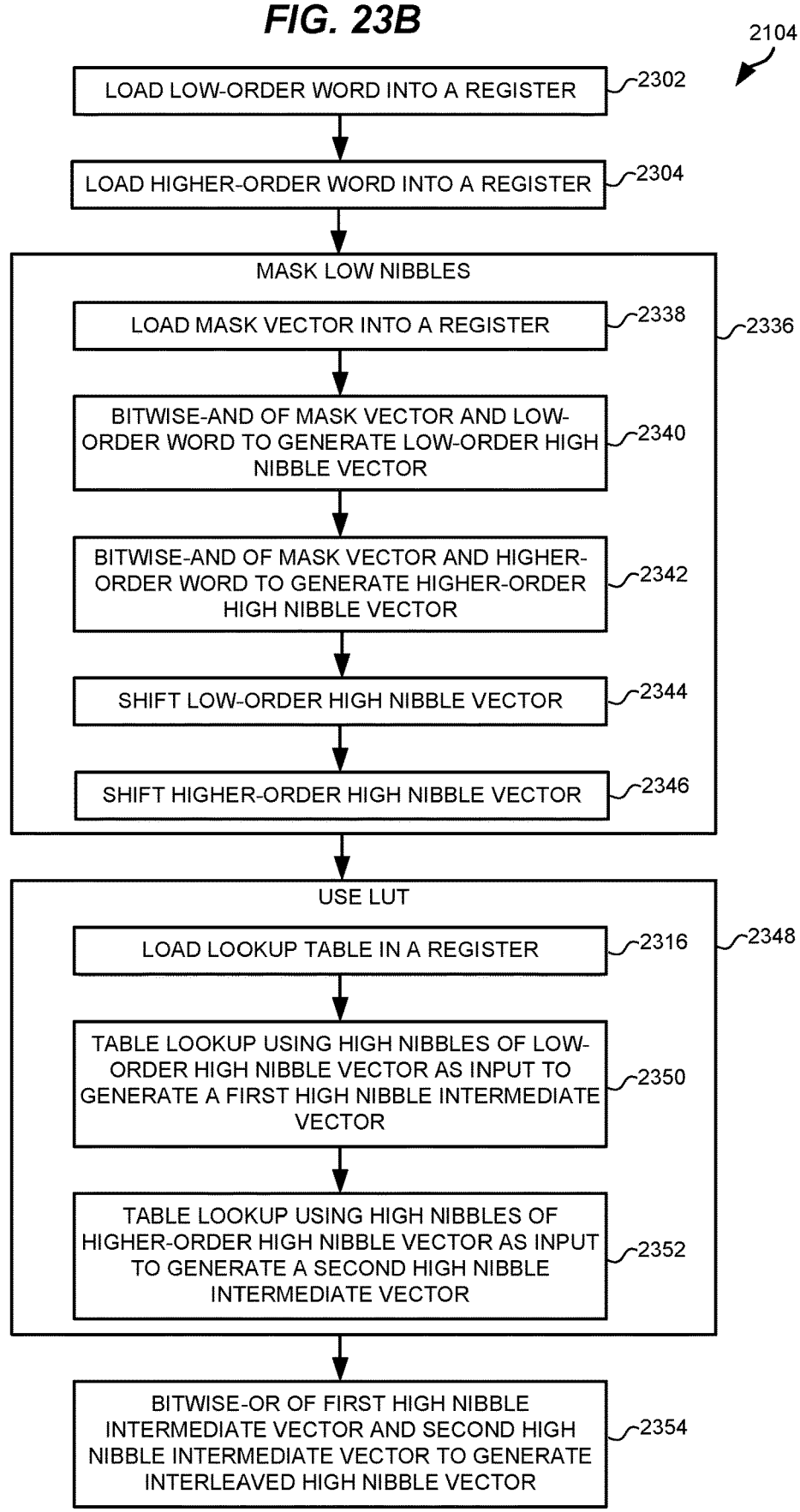
Figure 24:
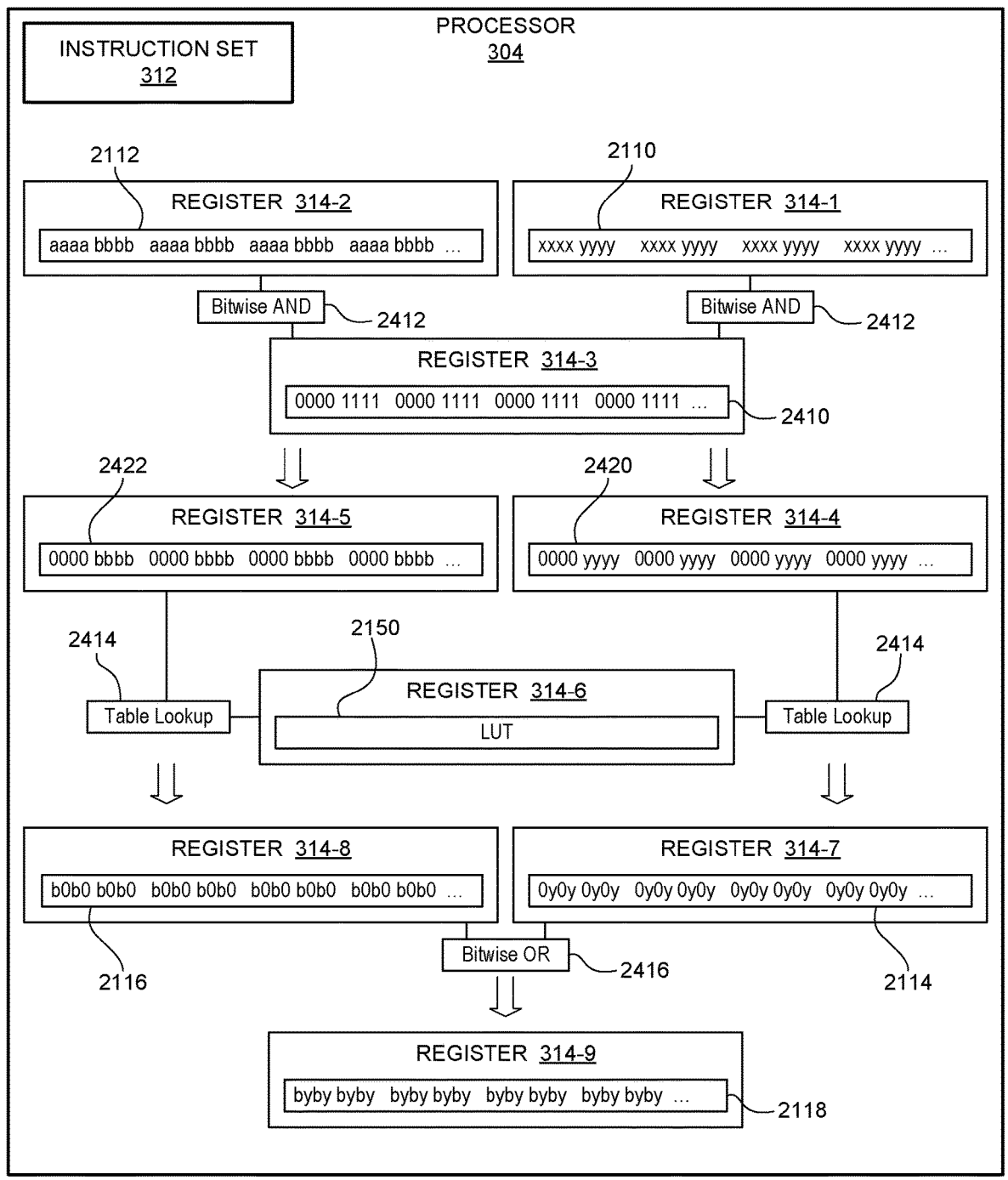
FIGS. 24-26 are schematic diagrams illustrating an interleave process in an illustrative embodiment.
Figure 25:
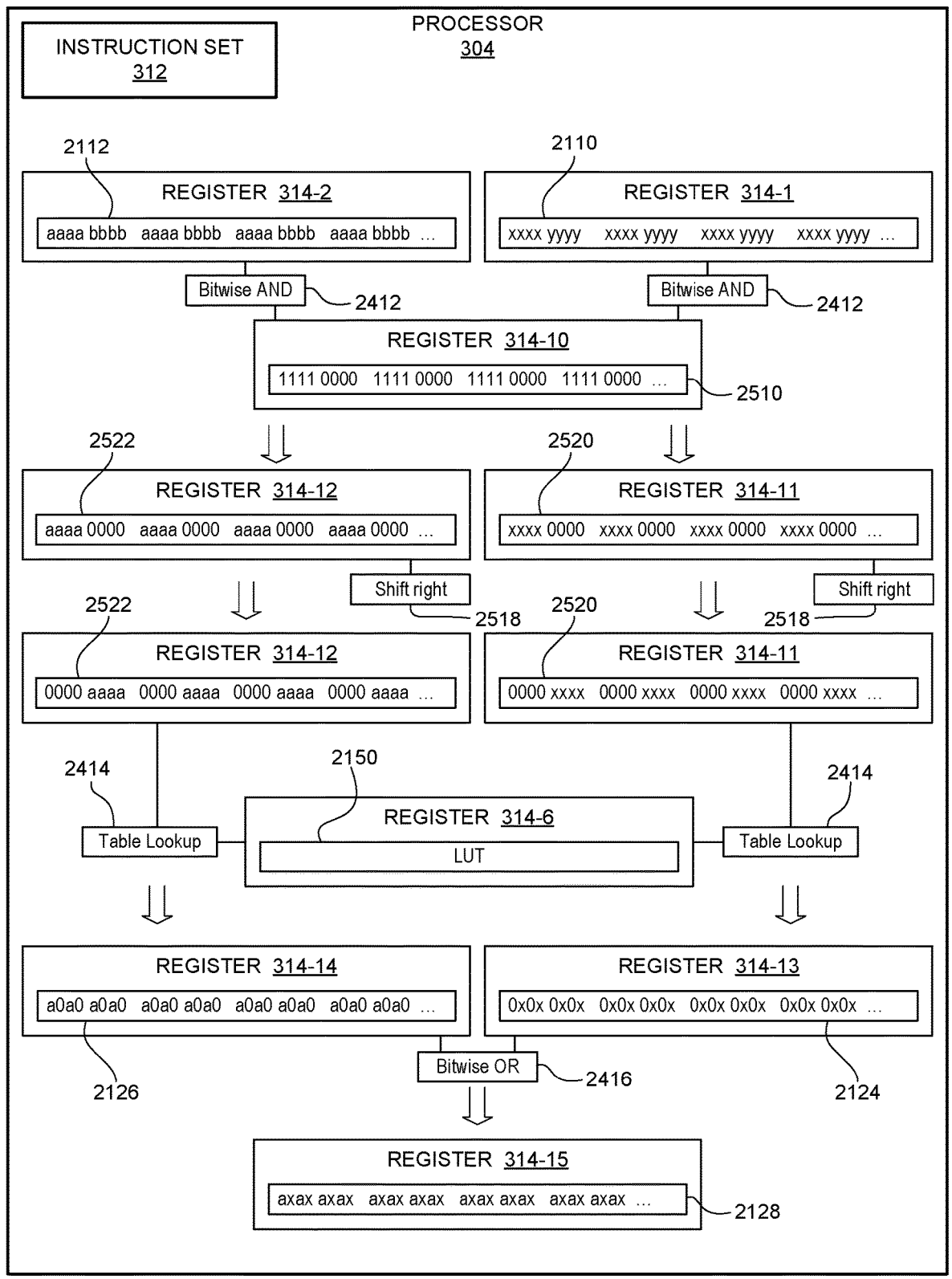
Figure 26:
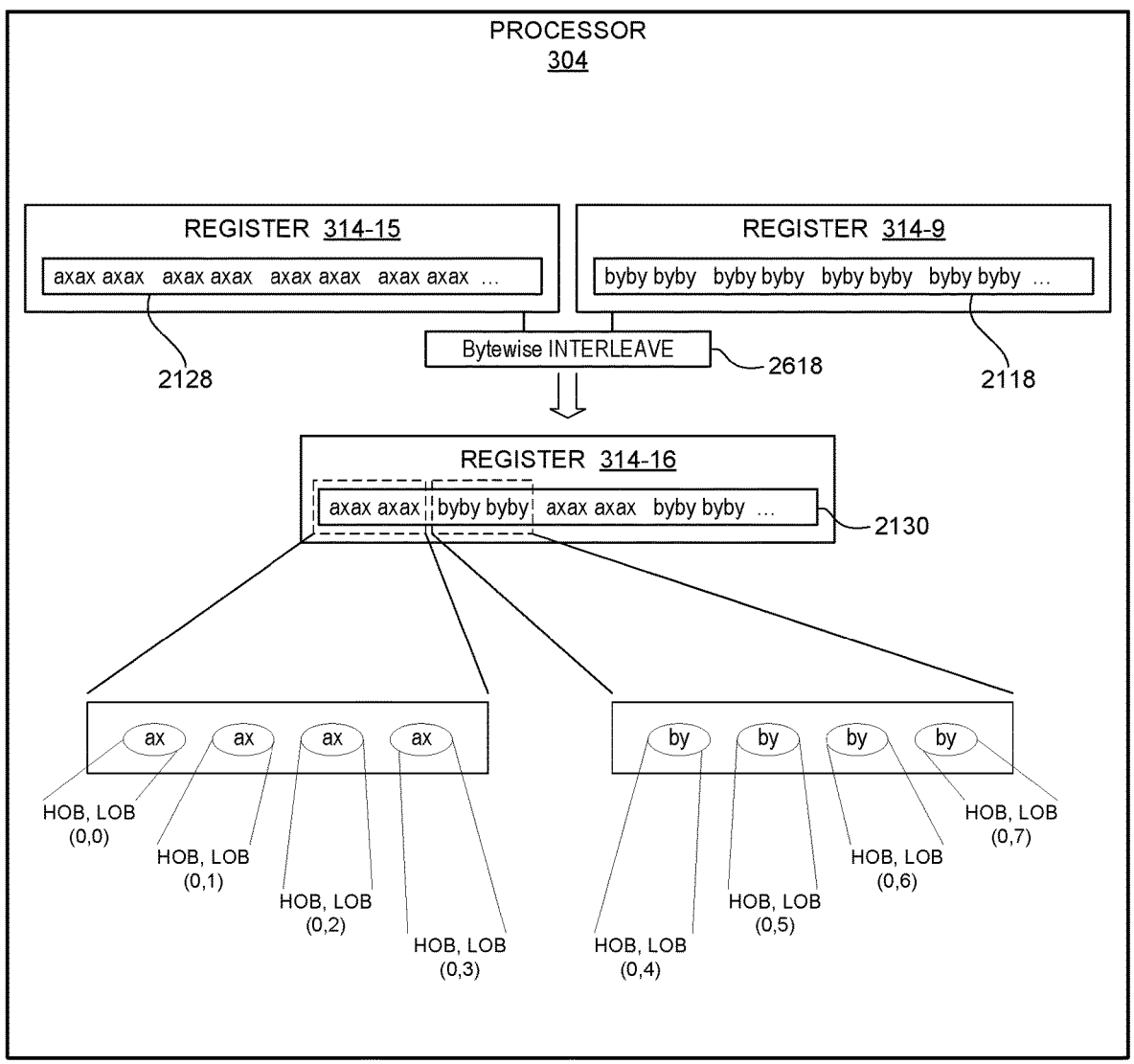

The following provides further details of an interleave process 2100 in illustrative embodiments. FIGS. 23A-23B are flow charts illustrating methods of performing an interleave process 2100 in an illustrative embodiment. FIGS. 24-26 are schematic diagrams illustrating an interleave process 2100 in an illustrative embodiment.

The steps of FIG. 23A and the schematic diagram of FIG. 24 further illustrate low nibble processing 2102. In FIG. 24, processor 304 operates based on an instruction set 312 to process data that is loaded in registers 314. To perform low nibble processing 2102, processor 304 performs one or more load operations to load a low-order word 2110 into a (first) register 314-1 (step 2302 of FIG. 23A), and to load a higher-order word 2112 into a (second) register 314-2 (step 2304 of FIG. 23A). Processor 304 masks the high nibbles 2208 in the low-order word 2110 and the higher-order word 2112 (step 2306 of FIG. 23A). Masking results in the technical benefit of computational efficiency for selecting bits for the low nibble processing 2102 versus other methods. To do so, processor 304 performs a load operation to load a mask vector 2410 into a (third) register 314-3 (step 2308 of FIG. 23A). The mask vector 2410 (also referred to as a low nibble mask vector) is a bitmask configured to set the high nibbles "off". Processor 304 performs a bitwise-AND operation 2412 on the low-order word 2110 and the mask vector 2410 to generate a low-order low nibble vector 2420 stored in a (fourth) register 314-4 (step 2310 of FIG. 23A), and a bitwise-AND operation 2412 on the higher-order word 2112 and the mask vector 2410 to generate a higher-order low nibble vector 2422 stored in a (fifth) register 314-5 (step 2312 of FIG. 23A). The low-order low nibble vector 2420 therefore comprises the low nibbles 2206 from a block of bits from the low-order bit plane 224-A, and the higher-order low nibble vector 2422 comprises the low nibbles 2206 from a corresponding block of bits from the higher-order bit plane 224-B (with the high nibbles 2208 zeroed out).

Processor 304 uses a lookup table 2150 to map the low nibbles 2206 to eight-bit output values (step 2314 of FIG. 23A). To do so, processor 304 performs a load operation to load a lookup table (LUT) 2150 in a (sixth) register 314-6 (step 2316 of FIG. 23A). FIG. 27 illustrates a lookup table 2150 in an illustrative embodiment. Lookup table 2150 maps a four-bit input value 2702 to an eight-bit output value 2704. An input value 2702 is mapped to an output value 2704 where extra zeros 2154 (underlined in FIG. 27) are interleaved with the bits of the input value 2702. In the embodiment in FIG. 27, the extra zeros 2154 to the left of the bits of the input value 2702, but the extra zeros 2154 may be to the right in another embodiment.

In FIG. 24, processor 304 performs a table lookup operation 2414 in lookup table 2150 using the low nibbles 2206 (e.g., "yyyy") of the low-order low nibble vector 2420 as input to generate a first low nibble intermediate vector 2114 stored in a (seventh) register 314-7 (step 2318 of FIG. 23A). The first low nibble intermediate vector 2114 comprises the low nibbles 2206 of the low-order low nibble vector 2420 interleaved with extra zeros 2154 (e.g., "0y0y 0y0y"). In an embodiment, the extra zeros 2154 are to the left of the bits of the low nibbles 2206 in the first low nibble intermediate vector 2114. Processor 304 performs a table lookup operation 2414 in lookup table 2150 using the low nibbles 2206 (e.g., "bbbb") of the higher-order low nibble vector 2422 as input to generate a second low nibble intermediate vector 2116 stored in a (eighth) register 314-8 (step 2320 of FIG. 23A). The second low nibble intermediate vector 2116 comprises the low nibbles 2206 of the higher-order low nibble vector 2422 interleaved with extra zeros 2154 (e.g., "b0b0 b0b0"). In an embodiment, the extra zeros 2154 are to the right of the bits of the low nibbles 2206 in the second low nibble intermediate vector 2116.

As is evident in FIG. 24, the extra zeros 2154 are shifted (i.e., offset) by one bit in the first low nibble intermediate vector 2114 and the second low nibble intermediate vector 2116. This may be accomplished by a shift operation, the use of a different lookup table 2150, or some other desired manner. Processor 304 then performs a bitwise-OR operation 2416 on the first low nibble intermediate vector 2114 and the second low nibble intermediate vector 2116 to generate the interleaved low nibble vector 2118 stored in a (ninth) register 314-9 (step 2322 of FIG. 23A). Although different registers 314 are discussed herein, it is understood that processor 304 may re-use certain registers 314 for subsequent operations as desired.

The steps of FIG. 23B and the schematic diagram of FIG. 25 further illustrate high nibble processing 2104. In FIG. 25, processor 304 operates based on the instruction set 312 to process data that is loaded in registers 314. It is noted that certain operations for high nibble processing 2104 may be performed before, after, or concurrently with the low nibble processing 2102. Operations that are common to low nibble processing 2102 and high nibble processing 2104 are discussed separately for clarity, such as load operations to load the low-order word 2110 and the higher-order word 2112, a load operation to load a lookup table 2150, etc., but these operations may be redundant and optional for low nibble processing 2102 or high nibble processing 2104 depending on the order of the operations.

To perform high nibble processing 2104, processor 304 performs one or more load operations to load the low-order word 2110 into a (first) register 314-1 (step 2302 of FIG. 23B), and to load the higher-order word 2112 into a (second) register 314-2 (step 2304 of FIG. 23B). Processor 304 masks the low nibbles 2206 in the low-order word 2110 and the higher-order word 2112 (step 2336 of FIG. 23B). Masking results in the technical benefit of computational efficiency for selecting bits for high nibble processing 2104 versus other methods. To do so, processor 304 performs a load operation to load a mask vector 2510 into a (tenth) register 314-10 (step 2338 of FIG. 23B). The mask vector 2510 (also referred to as a high nibble mask vector) is a bitmask configured to set the low nibbles "off". Processor 304 performs a bitwise-AND operation 2412 on the low-order word 2110 and the mask vector 2510 to generate a low-order high nibble vector 2520 stored in a (eleventh) register 314-11 (step 2340 of FIG. 23B), and a bitwise-AND operation 2412 on the higher-order word 2112 and the mask vector 2510 to generate a higher-order high nibble vector 2522 stored in a (twelfth) register 314-12 (step 2342 of FIG. 23B). The low-order high nibble vector 2520 therefore comprises the high nibbles 2208 from a block of bits from the low-order bit plane 224-A, and the higher-order high nibble vector 2522 comprises the high nibbles 2208 from a corresponding block of bits from the higher-order bit plane 224-B (with the low nibbles 2206 zeroed out). Processor 304 may perform a shift operation 2518 on the low-order high nibble vector 2520 to shift the bits right by four bits (step 2344 of FIG. 23B), and a shift operation 2518 on the higher-order high nibble vector 2522 to shift the bits right by four bits (step 2346 of FIG. 23B).

Processor 304 uses a lookup table 2150 to map the high nibbles 2208 to eight-bit output values (step 2348 of FIG. 23B). To do so, processor 304 performs a load operation to load a lookup table (LUT) 2150 in a (sixth) register 314-6 (step 2316 of FIG. 23B). Processor 304 performs a table lookup operation 2414 in lookup table 2150 using the high nibbles 2208 (e.g., "xxxx") as shifted of the low-order high nibble vector 2520 as input to generate a first high nibble intermediate vector 2124 stored in a (thirteenth) register 314-13 (step 2350 of FIG. 23B). The first high nibble intermediate vector 2124 comprises the high nibbles 2208 of the low-order high nibble vector 2520 (as shifted) interleaved with extra zeros 2154 (e.g., "0x0x 0x0x"). In an embodiment, the extra zeros 2154 are to the left of the bits of the high nibbles 2208 in the first high nibble intermediate vector 2124. Processor 304 performs a table lookup operation 2414 in lookup table 2150 using the high nibbles 2208 (e.g., "aaaa") as shifted of the higher-order high nibble vector 2522 as input to generate a second high nibble intermediate vector 2126 stored in a (fourteenth) register 314-14 (step 2352 of FIG. 23B). The second high nibble intermediate vector 2126 comprises the high nibbles 2208 of the higher-order high nibble vector 2522 (as shifted) interleaved with extra zeros 2154 (e.g., "a0a0 a0a0"). In an embodiment, the extra zeros 2154 are to the right of the bits of the high nibbles 2208 in the second high nibble intermediate vector 2126.

As is evident in FIG. 25, the extra zeros 2154 are shifted (i.e., offset) by one bit in the first high nibble intermediate vector 2124 and the second high nibble intermediate vector 2126. This may be accomplished by a shift operation, the use of a different lookup table 2150, or some other desired manner. Processor 304 then performs a bitwise-OR operation 2416 on the first high nibble intermediate vector 2124 and the second high nibble intermediate vector 2126 to generate the interleaved high nibble vector 2128 stored in a (fifteenth) register 314-15 (step 2354 of FIG. 23B). Although different registers 314 are discussed herein, it is understood that processor 304 may re-use certain registers 314 for subsequent operations as desired.

In FIG. 26, processor 304 performs a bytewise interleave operation 2618 on the interleaved low nibble vector 2118 and the interleaved high nibble vector 2128 to generate an interleaved vector 2130 stored in a (sixteenth) register 314-16. The interleaved vector 2130 comprises multi-bit values or bit fields 1802 for the block of pixels 210. For example, the first byte of interleaved vector 2130 comprises two-bit values for four pixels 210 (e.g., for pixel positions "0,0", "0,1", "0,2", and "0,3"). The second byte of interleaved vector 2130 comprises two-bit values for the next four pixels 210 (e.g., for pixel positions "0,4", "0,5", "0,6", and "0,7"). One technical benefit is bit planes 224 may be efficiently transformed into bit field format 204 for storage and/or transmission to another system. The interleave process 2100 uses low-latency register-to-register operations, register-load, and register-store, which results in very fast performance. For example, operations (except loading and storing) take place in vectorized operand registers. Even if the operations require multiple instructions, the operations have low latency and are very fast (~1 ns). Further, the use of a 4-bit, in-register table lookup results in a technical benefit of computational efficiency that overcomes the lack of a direct bitwise interleave operation in the instruction set 312.

Figure 28:
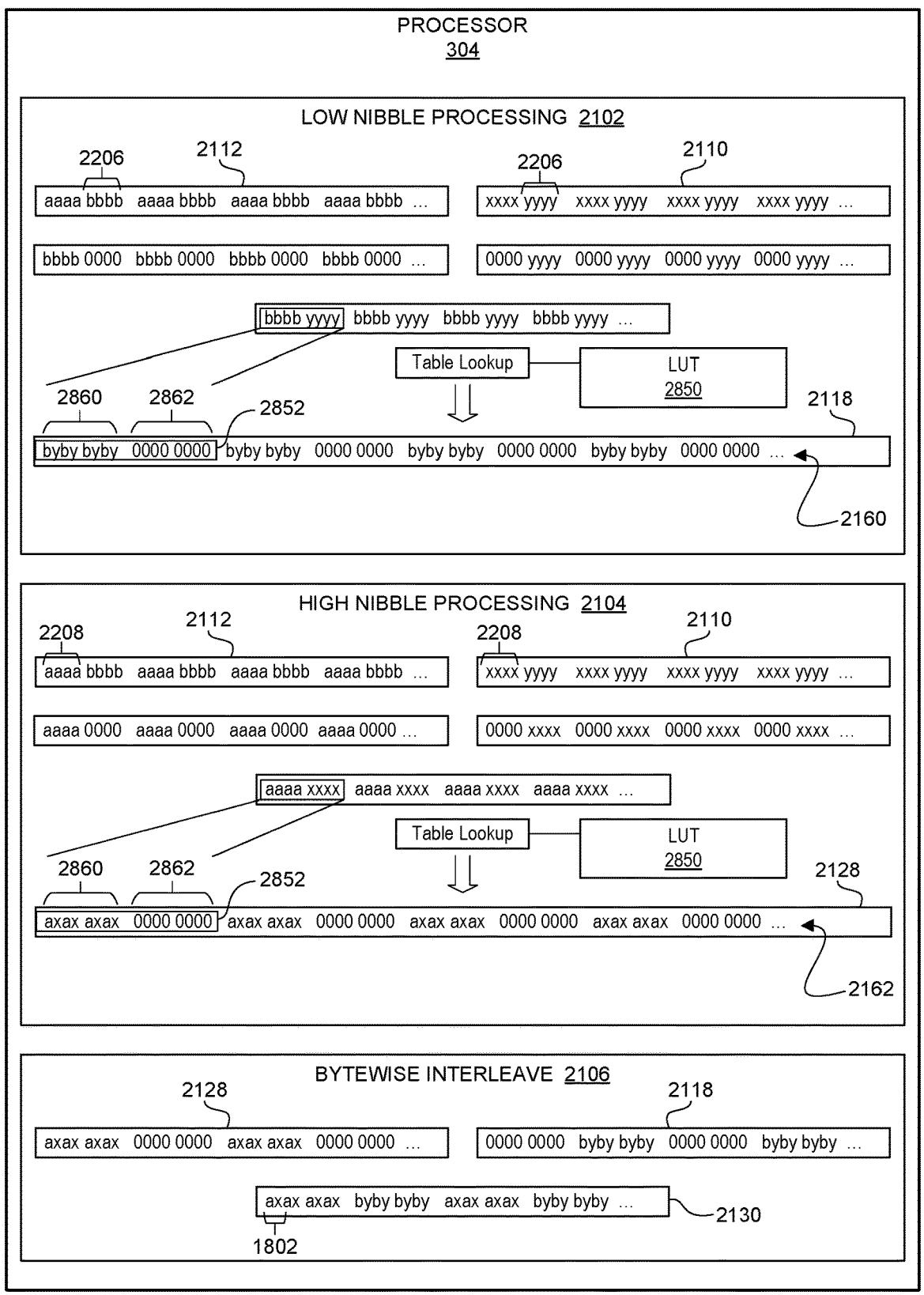
FIG. 28 is a schematic diagram illustrating an interleave process in an illustrative embodiment.

FIG. 28 is a schematic diagram illustrating an interleave process 2800 in an illustrative embodiment. As above, the interleave process 2800 comprises low nibble processing 2102, high nibble processing 2104, and bytewise interleaving 2106. For the interleave process 2800 in FIG. 28, processor 304 of bit plane converter 150 may operate on blocks 2004 of bits from bit planes 224 at a time. Thus, processor 304 may identify or select a set of bits in a block 2004 from bit plane 224-A (i.e., the low-order bits 230) and a corresponding set of bits in a block 2004 from bit plane 224-B (i.e., the higher-order bits 232). The set of bits from the low-order bit plane 224-A is referred to as a low-order word 2110 (or first word), and the set of bits from the higher-order bit plane 224-B is referred to as a higher-order word 2112 (or second word).

For low nibble processing 2102, processor 304 may zero out or mask the high nibbles 2208 of the low-order word 2110 and the higher-order word 2112. Processor 304 processes the low nibbles 2206 of the low-order word 2110 and the higher-order word 2112 using a lookup table (LUT) 2850 to generate bitwise-interleaved low nibbles 2160 (step 1912 of FIG. 19), also referred to as an interleaved low nibble vector 2118. In the interleaved low nibble vector 2118, the low nibbles 2206 of the low-order word 2110 are interleaved with the low nibbles 2206 of the higher-order word 2112. Also, bytes of the interleaved low nibbles 2206 are separated or interleaved with bytes of extra zeros 2154 (e.g., "byby byby 0000 0000 byby byby 0000 0000").

For example, the lookup table 2850 may map a byte of nibbles to a sixteen-bit output value 2852 comprising a byte 2860 of the interleaved nibbles and a byte 2862 of extra zeros 2154. Processor 304 may use or implement the lookup table 2850 to map the low nibbles 2206 of the low-order word 2110 and the low nibbles 2206 of the higher-order word 2112 to sixteen-bit output values 2852 of interleaved low nibble vector 2118.

For the high nibble processing 2104, processor 304 may zero out or mask the low nibbles 2206 of the low-order word 2110 and the higher-order word 2112. Processor 304 processes the high nibbles 2208 of the low-order word 2110 and the higher-order word 2112 using a lookup table 2850 (i.e., the same or another/different lookup table) to generate bitwise-interleaved high nibbles 2162 (step 1914 of FIG. 19), also referred to as an interleaved high nibble vector 2128. In the interleaved high nibble vector 2128, the high nibbles 2208 of the low-order word 2110 are interleaved with the high nibbles 2208 of the higher-order word 2112. Also, bytes of the interleaved high nibbles 2208 are separated or interleaved with bytes of extra zeros 2154 (e.g., "axax axax 0000 0000 axax axax 0000 0000"). For example, processor 304 may use or implement the lookup table 2850 to map the high nibbles 2208 of the low-order word 2110 and the high nibbles 2208 of the higher-order word 2112 to sixteen-bit output values 2852 of interleaved high nibble vector 2128.

For the bytewise interleaving 2106, processor 304 interleaves bytes 2202 of the bitwise-interleaved low nibbles 2160 (i.e., interleaved low nibble vector 2118) with bytes 2202 of the bitwise-interleaved high nibbles 2162 (i.e., interleaved high nibble vector 2128) (step 1916 of FIG. 19). The interleaved vector 2130 therefore comprises multi-bit values or bit fields 1802 for the block of the pixels 210. Processor 304 may repeat the interleave process 2800 on multiple blocks of bits from the bit planes 224. The interleaved vectors 2130 resulting from the interleave process 2800 form the bit field data structure 240, where individual pixel values are represented by a bit field 1802 of two consecutive bits. One technical benefit is bit planes 224 may be efficiently transformed into bit field format 204 for storage or transmission to another system.

Figure 29A:
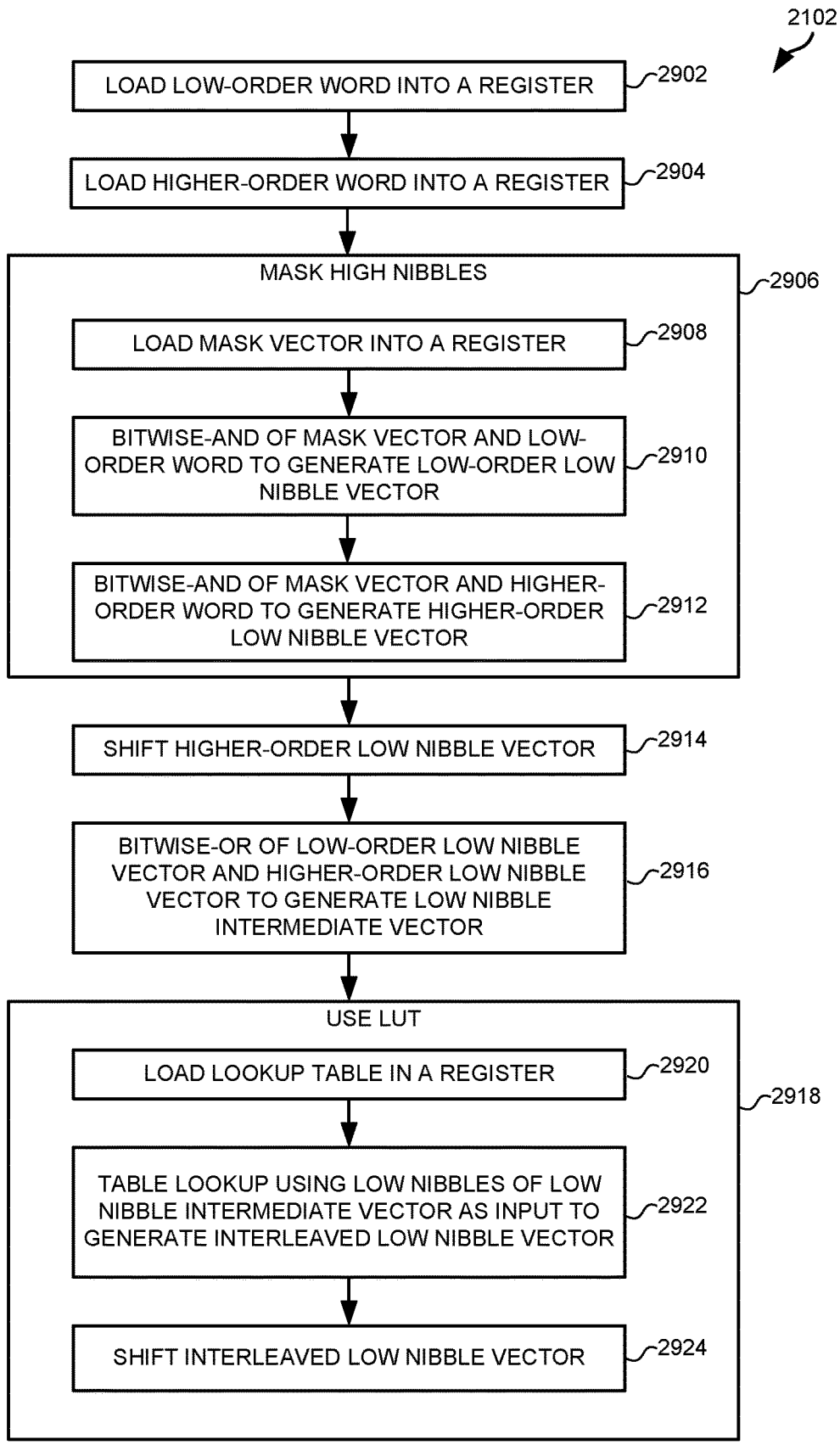
FIGS. 29A-29B are flow charts illustrating methods of performing an interleave process in an illustrative embodiment.
Figure 29B:
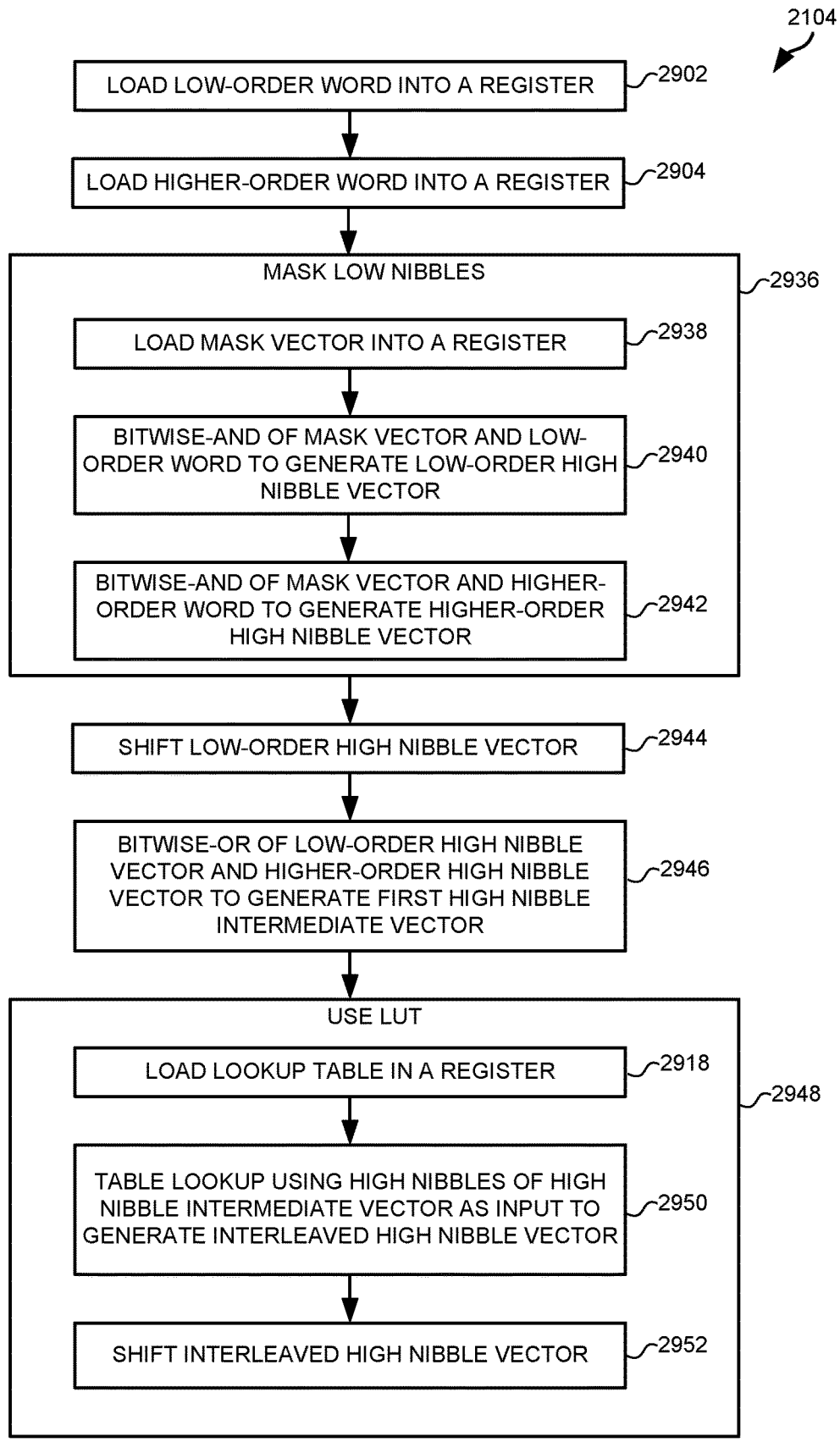
Figure 30:
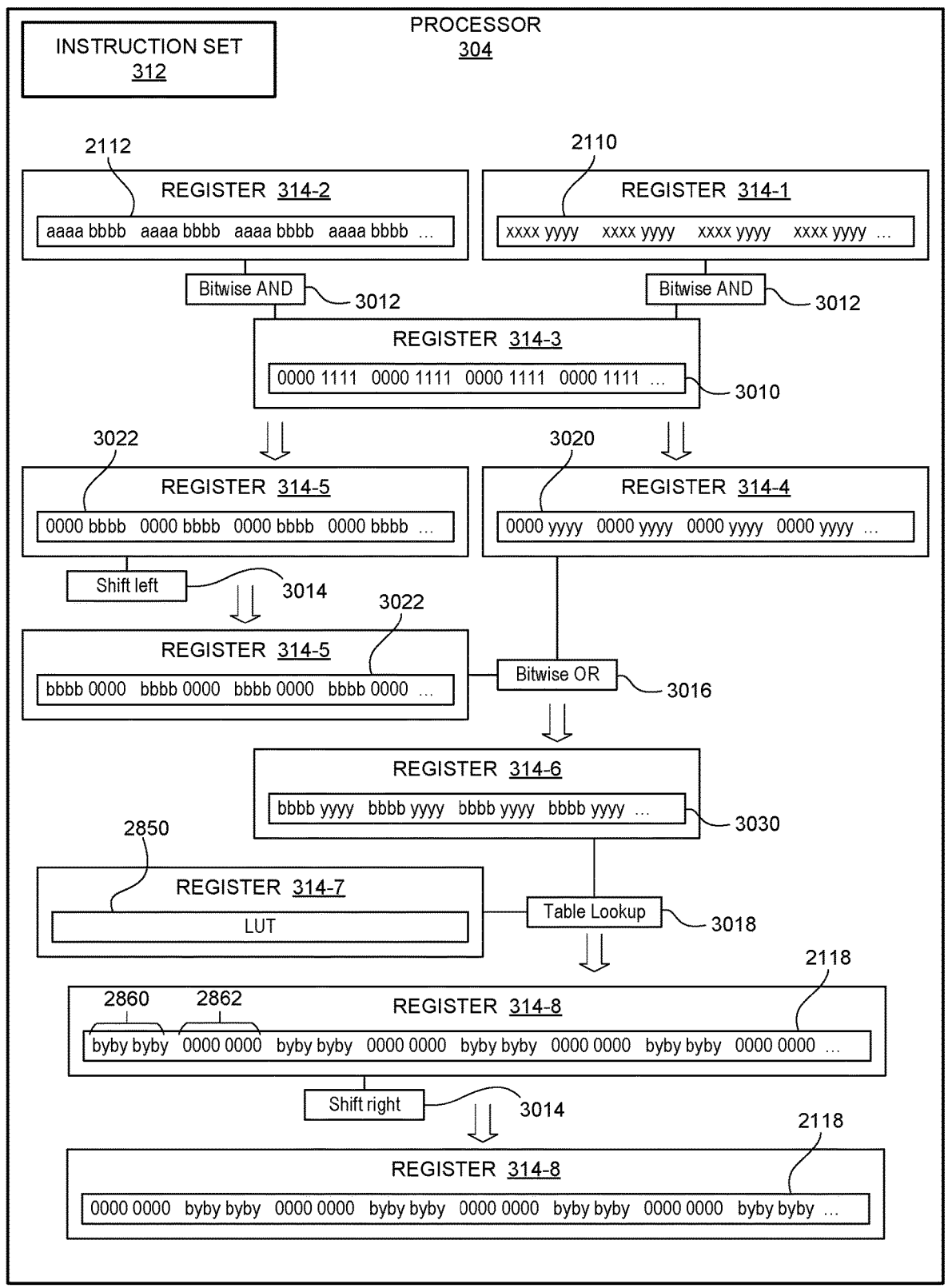
FIGS. 30-32 are schematic diagrams illustrating an interleave process in an illustrative embodiment.
Figure 31:
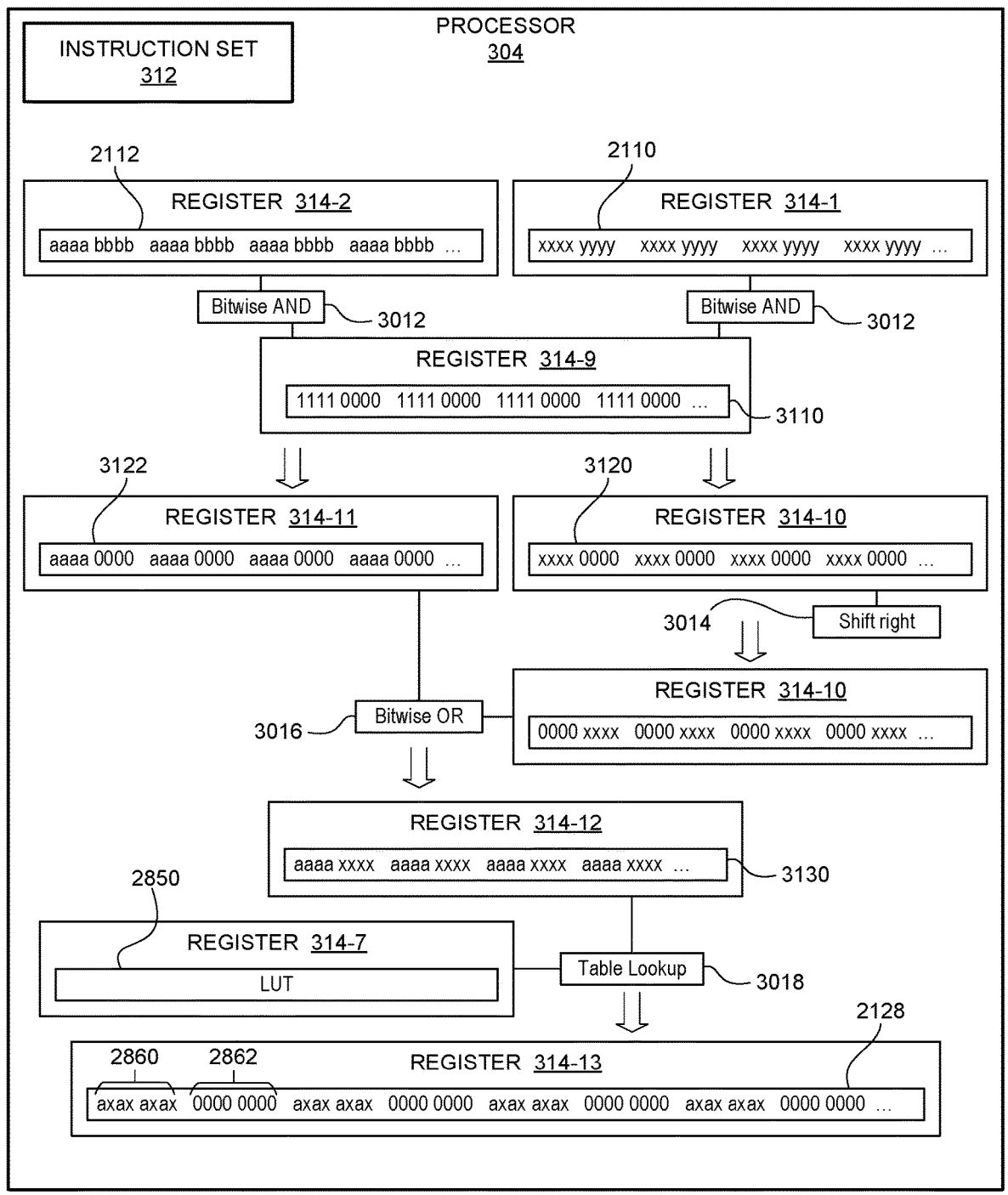
Figure 32:
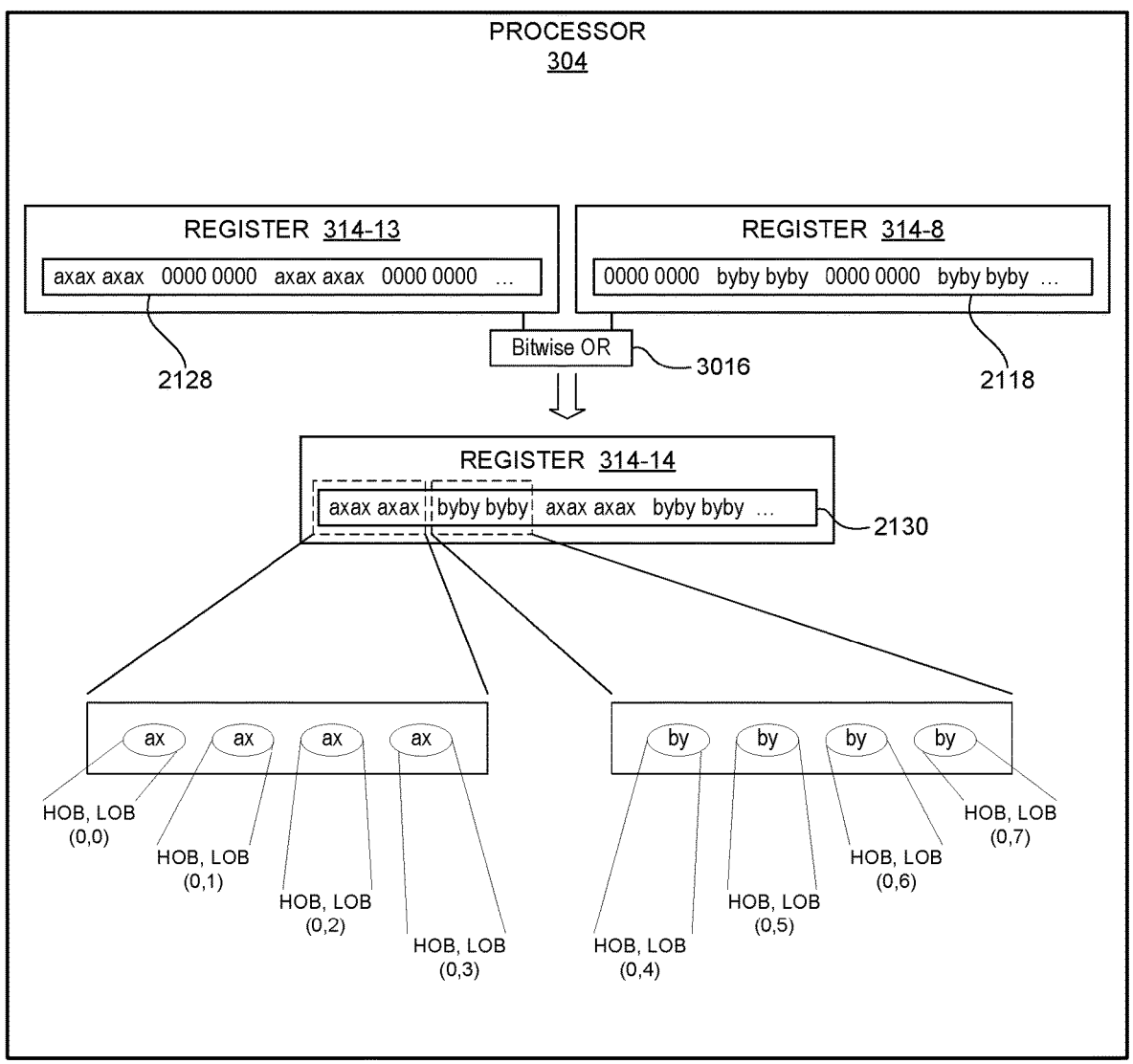

FIGS. 29A-29B are flow charts illustrating methods of performing an interleave process 2800 in an illustrative embodiment. FIGS. 30-32 are schematic diagrams illustrating an interleave process 2800 in an illustrative embodiment.

The steps of FIG. 29A and the schematic diagram of FIG. 30 further illustrate low nibble processing 2102. In FIG. 30, processor 304 operates based on an instruction set 312 to process data that is loaded in registers 314. To perform low nibble processing 2102, processor 304 performs one or more load operations to load the low-order word 2110 into a (first) register 314-1 (step 2902 of FIG. 29A), and to load the higher-order word 2112 into a (second) register 314-2 (step 2904 of FIG. 29A). Processor 304 masks the high nibbles 2208 in the low-order word 2110 and the higher-order word 2112 (step 2906 of FIG. 29A). To do so, processor 304 performs a load operation to load a mask vector 3010 into a (third) register 314-3 (step 2908 of FIG. 29A). The mask vector 3010 (also referred to as a low nibble mask vector) is a bitmask configured to set the high nibbles "off". Processor 304 performs a bitwise-AND operation 3012 on the low-order word 2110 and the mask vector 3010 to generate a low-order low nibble vector 3020 stored in a (fourth) register 314-4 (step 2910 of FIG. 29A), and a bitwise-AND operation 3012 on the higher-order word 2112 and the mask vector 3010 to generate a higher-order low nibble vector 3022 stored in a (fifth) register 314-5 (step 2912 of FIG. 29A). The low-order low nibble vector 3020 therefore comprises the low nibbles 2206 from a block of bits from the low-order bit plane 224-A, and the higher-order low nibble vector 3022 comprises the low nibbles 2206 from a corresponding block of bits from the higher-order bit plane 224-B.

Processor 304 performs a shift operation 3014 to shift the higher-order low nibble vector 3022 in register 314-5 left by four bits (step 2914 of FIG. 29A). Processor 304 then performs a bitwise-OR operation 3016 on the low-order low nibble vector 3020 and the higher-order low nibble vector 3022 (shifted) to generate a low nibble intermediate vector 3030 stored in a (sixth) register 314-6 (step 2916 of FIG. 29A). Each byte of the low nibble intermediate vector 3030 comprises a low nibble 2206 of the higher-order word 2112 followed by a low nibble 2206 of the low-order word 2110.

Processor 304 uses a lookup table 2850 to map bytes of low nibbles 2206 to sixteen-bit output values (step 2918 of FIG. 29A). To do so, processor 304 performs a load operation to load a lookup table (LUT) 2850 in a (seventh) register 314-7 (step 2920 of FIG. 29A). Processor 304 performs a table lookup operation 3018 in lookup table 2850 using bytes of low nibbles 2206 (e.g., "bbbb yyyy") of the low nibble vector intermediate 3030 as input to generate interleaved low nibble vector 2118 stored in a (eighth) register 314-8 (step 2922 of FIG. 29A). In an embodiment, the interleaved low nibble vector 2118 comprises a (first) byte 2860 of interleaved low nibbles 2206 (where the low nibbles 2206 of the low-order low nibble vector 3020 are interleaved with the low nibbles 2206 of the higher-order low nibble vector 3022), followed by a (second) byte 2862 of extra zeros 2154 (e.g., "byby byby 0000 0000"). However, the bytes 2860 of interleaved low nibbles 2206 may precede the bytes 2862 of extra zeros 2154 in the output of the lookup table 2850 in other embodiments. Processor 304 may then perform a shift operation 3014 to shift the interleaved low nibble vector 2118 in register 314-8 right by eight bits (step 2924 of FIG. 29A). However, the shift operation 3014 is optional depending on whether the output of the lookup table 2850 comprises bytes 2862 of extra zeros 2154 following or preceding the bytes 2860 of interleaved low nibbles 2206. Although different registers 314 are discussed herein, it is understood that processor 304 may re-use certain registers 314 for subsequent operations as desired.

The steps of FIG. 29B and the schematic diagram of FIG. 31 further illustrate high nibble processing 2104. In FIG. 31, processor 304 operates based on the instruction set 312 to process data that is loaded in registers 314. It is noted that certain operations for high nibble processing 2104 may be performed before, after, or concurrently with the low nibble processing 2102. Operations that are common to low nibble processing 2102 and high nibble processing 2104 are discussed separately for clarity, such as load operations to load the low-order word 2110 and the higher-order word 2112, a load operation to load a lookup table 2850, etc., but these operations may be redundant and optional for low nibble processing 2102 or high nibble processing 2104 depending on the order of the operations.

To perform high nibble processing 2104, processor 304 performs one or more load operations to load the low-order word 2110 into a (first) register 314-1 (step 2902 of FIG. 29B), and to load the higher-order word 2112 into a (second) register 314-2 (step 2904 of FIG. 29B). Processor 304 masks the low nibbles 2206 in the low-order word 2110 and the higher-order word 2112 (step 2936 of FIG. 29B). To do so, processor 304 performs a load operation to load a mask vector 3110 into a (ninth) register 314-9 (step 2938 of FIG. 29B). The mask vector 3110 (also referred to as a high nibble mask vector) is a bitmask configured to set the low nibbles "off". Processor 304 performs a bitwise-AND operation 3012 on the low-order word 2110 and the mask vector 3110 to generate a low-order high nibble vector 3120 stored in a (tenth) register 314-10 (step 2940 of FIG. 29B), and a bitwise-AND operation 3012 on the higher-order word 2112 and the mask vector 3110 to generate a higher-order high nibble vector 3122 stored in a (eleventh) register 314-11 (step 2942 of FIG. 29B). The low-order high nibble vector 3120 therefore comprises the high nibbles 2208 from a block of bits from the low-order bit plane 224-A, and the higher-order high nibble vector 3122 comprises the high nibbles 2208 from a corresponding block of bits from the higher-order bit plane 224-B.

Processor 304 performs a shift operation 3014 to shift the low-order high nibble vector 3120 in register 314-10 right by four bits (step 2944 of FIG. 29B). Processor 304 then performs a bitwise-OR operation 3016 on the low-order high nibble vector 3120 (shifted) and the higher-order high nibble vector 3122 to generate a high nibble intermediate vector 3130 stored in a (twelfth) register 314-12 (step 2946 of FIG. 29B). Each byte of the high nibble intermediate vector 3130 comprises a high nibble 2208 of the higher-order word 2112 followed by a high nibble 2208 of the low-order word 2110.

Processor 304 uses a lookup table 2850 to map bytes of high nibbles 2208 to sixteen-bit output values (step 2948 of FIG. 29B). To do so, processor 304 performs a load operation to load a lookup table (LUT) 2850 in a (seventh) register 314-7 (step 2918 of FIG. 29B). Processor 304 performs a table lookup operation 3018 in lookup table 2850 using bytes of high nibbles 2208 (e.g., "aaaa xxxx") of the high nibble intermediate vector 3130 as input to generate interleaved high nibble vector 2128 stored in a (thirteenth) register 314-13 (step 2950 of FIG. 29B). In an embodiment, the interleaved high nibble vector 2128 comprises a (first) byte 2860 of interleaved high nibbles 2208 (where the high nibbles 2208 of the low-order high nibble vector 3120 are interleaved with the high nibbles 2208 of the higher-order high nibble vector 3122) (e.g., "axax axax 0000 0000"), followed by a (second) byte 2862 of extra zeros 2154. However, the bytes 2860 of interleaved high nibbles 2208 may precede the bytes 2862 of extra zeros 2154 in the output of the lookup table 2850 in other embodiments. Although not shown in FIG. 31, processor 304 may perform a shift operation 3014 to shift the interleaved high nibble vector 2128 in register 314-13 left by eight bits (step 2952 of FIG. 29B). However, the shift operation 3014 is optional depending on whether the output of the lookup table 2850 comprises bytes 2862 of extra zeros 2154 following or preceding the bytes 2860 of interleaved low nibbles 2206. Although different registers 314 are discussed herein, it is understood that processor 304 may re-use certain registers 314 for subsequent operations as desired.

In FIG. 32, processor 304 performs a bitwise-OR operation 3016 on the interleaved low nibble vector 2118 and the interleaved high nibble vector 2128 to generate an interleaved vector 2130 stored in a (fourteenth) register 314-14. The interleaved vector 2130 comprises multi-bit values or bit fields 1802 for the block of pixels 210. For example, the first byte of interleaved vector 2130 comprises two-bit values for four pixels 210 (e.g., for pixel positions "0,0", "0,1", "0,2", and "0,3"). The second byte of interleaved vector 2130 comprises two-bit values for the next four pixels 210 (e.g., for pixel positions "0,4", "0,5", "0,6", and "0,7"). One technical benefit is bit planes 224 may be efficiently transformed into bit field format 204 for storage or transmission to another system. The interleave process 2800 uses low-latency register-to-register operations, register-load, and register-store, which results in very fast performance. For example, operations (except loading and storing) take place in vectorized operand registers. Even if the operations require multiple instructions, the operations have low latency and are very fast (~1 ns). Further, the use of an 8-bit, in-register table lookup results in a technical benefit of computational efficiency that overcomes the lack of a direct bitwise interleave operation in the instruction set 312.

Figure 33:
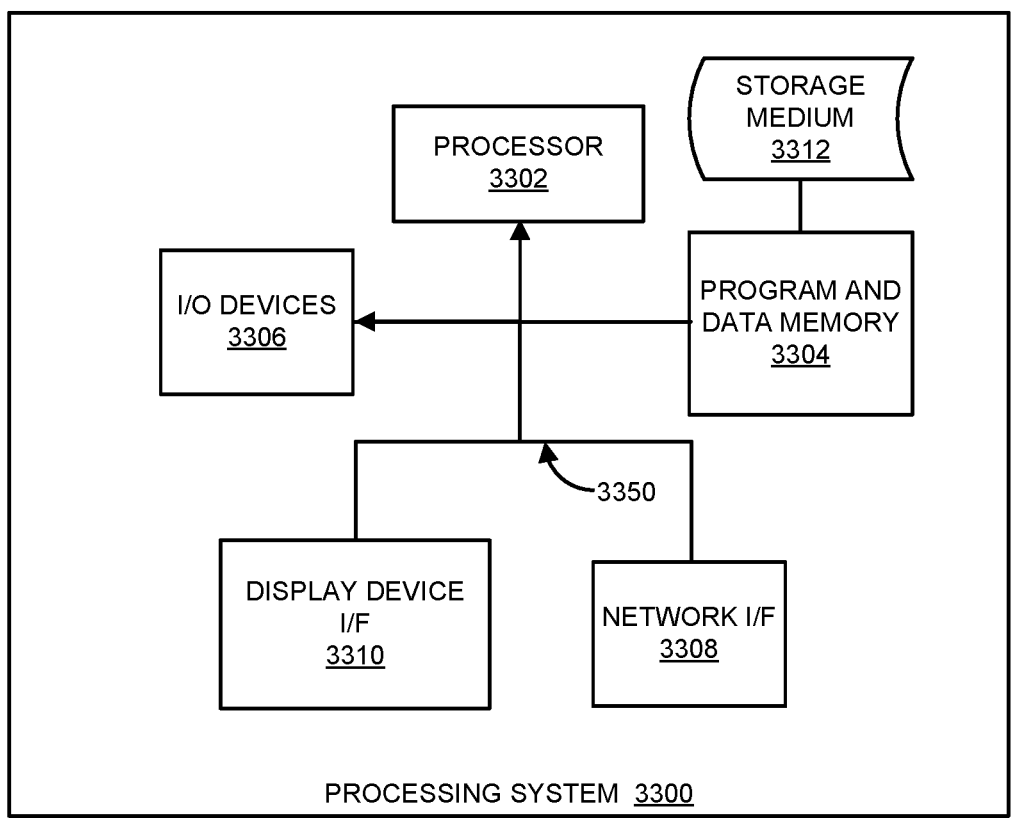
FIG. 33 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the image forming apparatus 100 to perform the various operations disclosed herein. FIG. 33 illustrates a processing system 3300 operable to execute a computer readable medium embodying programmed instructions to perform desired functions in an illustrative embodiment. Processing system 3300 is operable to perform the above operations by executing programmed instructions tangibly embodied on computer readable storage medium 3312. In this regard, embodiments can take the form of a computer program accessible via computer-readable medium 3312 providing program code for use by a computer or any other instruction execution system. For the purposes of this description, computer readable storage medium 3312 can be anything that can contain or store the program for use by the computer.

Computer readable storage medium 3312 can be an electronic, magnetic, optical, electromagnetic, infrared, or semiconductor device. Examples of computer readable storage medium 3312 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 3300, being suitable for storing and/or executing the program code, includes at least one processor 3302 coupled to program and data memory 3304 through a system bus 3350. Program and data memory 3304 can include local memory employed during actual execution of the program code, bulk storage, and cache memories that provide temporary storage of at least some program code and/or data in order to reduce the number of times the code and/or data are retrieved from bulk storage during execution.

I/O devices 3306 (including but not limited to keyboards, displays, pointing devices, etc.) can be coupled either directly or through intervening I/O controllers. Network adapter interfaces 3308 may also be integrated with the system to enable processing system 3300 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 3310 may be integrated with the system to interface to one or more display devices, such as printing systems and screens for presentation of data generated by processor 3302.

Although specific embodiments are described herein, the scope of the disclosure is not limited to those specific embodiments. The scope of the disclosure is defined by the following claims and any equivalents thereof.

What is claimed is:

1. A bit plane converter, comprising:
   at least one processor; and
   a memory including computer program code executable by the processor to cause the bit plane converter at least to:
   receive a first bit plane comprising low-order bits for an array of pixels, and a second bit plane comprising higher-order bits for the pixels; and perform an interleave process on the pixels to generate bit fields for the pixels, wherein the interleave process comprises:
    processing low nibbles of a low-order word of the low-order bits and the low nibbles of a higher-order word of the higher-order bits using at least one lookup table to generate a bitwise interleaved low nibble vector;
    processing high nibbles of the low-order word and the high nibbles of the higher-order word using the at least one lookup table to generate a bitwise interleaved high nibble vector; and
    interleaving bytes of the bitwise interleaved low nibble vector with bytes of the bitwise interleaved high nibble vector to generate a bitwise interleaved vector comprising the bit fields.

2. The bit plane converter of claim 1, wherein the processing the low nibbles comprises:
    masking the high nibbles of the low-order word to generate a low-order low nibble vector;
    masking the high nibbles of the higher-order word to generate a higher-order low nibble vector;
    using the at least one lookup table to map the low nibbles of the low-order low nibble vector to eight-bit output values of a first low nibble intermediate vector, wherein the first low nibble intermediate vector comprises bits of the low nibbles of the low-order low nibble vector interleaved with extra zeros;
    using the at least one lookup table to map the low nibbles of the higher-order low nibble vector to eight-bit output values of a second low nibble intermediate vector, wherein the second low nibble intermediate vector comprises bits of the low nibbles of the higher-order low nibble vector interleaved with extra zeros, and wherein the extra zeros of the first low nibble intermediate vector are shifted by one bit in relation to the second low nibble intermediate vector; and
    performing a bitwise-OR of the first low nibble intermediate vector and the second low nibble intermediate vector to generate the bitwise interleaved low nibble vector.

3. The bit plane converter of claim 2, wherein the processing the high nibbles comprises:
    masking the low nibbles of the low-order word to generate a low-order high nibble vector;
    masking the low nibbles of the higher-order word to generate a higher-order high nibble vector;
    shifting the low-order high nibble vector by four bits;
    shifting the higher-order high nibble vector by four bits;
    using the at least one lookup table to map the high nibbles of the low-order high nibble vector to eight-bit output values of a first high nibble intermediate vector, wherein the first high nibble intermediate vector comprises bits of the high nibbles of the low-order high nibble vector interleaved with extra zeros;
    using the at least one lookup table to map the high nibbles of the higher-order high nibble vector to eight-bit output values of a second high nibble intermediate vector, wherein the second high nibble intermediate vector comprises bits of the high nibbles of the higher-order high nibble vector interleaved with extra zeros, and wherein the extra zeros of the first high nibble intermediate vector are shifted by one bit in relation to the second high nibble intermediate vector; and
    performing a bitwise-OR of the first high nibble intermediate vector and the second high nibble intermediate vector to generate the bitwise interleaved high nibble vector.

4. The bit plane converter of claim 3, wherein the interleaving comprises:
    performing a bytewise interleave operation on the bitwise interleaved low nibble vector and the bitwise interleaved high nibble vector to generate the bitwise interleaved vector.

5. The bit plane converter of claim 1, wherein the processing the low nibbles comprises:
    masking the high nibbles of the low-order word to generate a low-order low nibble vector;
    masking the high nibbles of the higher-order word to generate a higher-order low nibble vector;
    shifting the higher-order low nibble vector by four bits;
    performing a bitwise-OR of the low-order low nibble vector and the higher-order low nibble vector to generate a low nibble intermediate vector where each byte comprises a low nibble of the higher-order word followed by a low nibble of the low-order word; and
    using the at least one lookup table to map bytes from the low nibble intermediate vector to sixteen-bit output values of the bitwise interleaved low nibble vector, wherein the bitwise interleaved low nibble vector comprises a first byte of the low nibbles of the higher-order word interleaved with the low nibbles of the low-order word and a second byte of extra zeros.

6. The bit plane converter of claim 5, wherein the processing the high nibbles comprises:
    masking the low nibbles of the low-order word to generate a low-order high nibble vector;
    masking the low nibbles of the higher-order word to generate a higher-order high nibble vector;
    shifting the low-order high nibble vector by four bits;
    performing a bitwise-OR of the low-order high nibble vector and the higher-order high nibble vector to generate a high nibble intermediate vector where each byte comprises a high nibble of the higher-order word followed by a high nibble of the low-order word; and
    using the at least one lookup table to map bytes from the high nibble intermediate vector to sixteen-bit output values of the bitwise interleaved high nibble vector, wherein the bitwise interleaved high nibble vector comprises a first byte of the high nibbles of the higher-order word interleaved with the high nibbles of the low-order word and a second byte of extra zeros.

7. The bit plane converter of claim 6, further comprising:
    shifting one of the bitwise interleaved low nibble vector or the bitwise interleaved high nibble vector by eight bits.

8. The bit plane converter of claim 7, wherein the interleaving comprises:
    performing a bitwise-OR of the bitwise interleaved low nibble vector and the bitwise interleaved high nibble vector to generate the bitwise interleaved vector.

9. The bit plane converter of claim 1, wherein:
    the low-order word and the higher-order word each have a size half a maximum operand size of the processor.

10. An image forming apparatus comprising:
    the bit plane converter of claim 1.

11. An image forming apparatus comprising:
    the bit plane converter of claim 1; and
    a halftone system configured to generate the first bit plane and the second bit plane.

12. A method of converting bit planes into a bit field data structure, the method comprising:
  receiving a first bit plane comprising low-order bits for an array of pixels, and a second bit plane comprising higher-order bits for the pixels; and
  performing an interleave process on the pixels to generate bit fields for the pixels by:
    processing low nibbles of a low-order word of the low-order bits and the low nibbles of a higher-order word of the higher-order bits using at least one lookup table to generate a bitwise interleaved low nibble vector;
    processing high nibbles of the low-order word and the high nibbles of the higher-order word using the at least one lookup table to generate a bitwise interleaved high nibble vector; and
    interleaving bytes of the bitwise interleaved low nibble vector with bytes of the bitwise interleaved high nibble vector to generate a bitwise interleaved vector comprising the bit fields.

13. The method of claim 12, wherein the processing the low nibbles comprises:
  masking the high nibbles of the low-order word to generate a low-order low nibble vector;
  masking the high nibbles of the higher-order word to generate a higher-order low nibble vector;
  using the at least one lookup table to map the low nibbles of the low-order low nibble vector to eight-bit output values of a first low nibble intermediate vector, wherein the first low nibble intermediate vector comprises bits of the low nibbles of the low-order low nibble vector interleaved with extra zeros;
  using the at least one lookup table to map the low nibbles of the higher-order low nibble vector to eight-bit output values of a second low nibble intermediate vector, wherein the second low nibble intermediate vector comprises bits of the low nibbles of the higher-order low nibble vector interleaved with extra zeros, and wherein the extra zeros of the first low nibble intermediate vector are shifted by one bit in relation to the second low nibble intermediate vector; and
  performing a bitwise-OR of the first low nibble intermediate vector and the second low nibble intermediate vector to generate the bitwise interleaved low nibble vector.

14. The method of claim 13, wherein the processing the high nibbles comprises:
  masking the low nibbles of the low-order word to generate a low-order high nibble vector;
  masking the low nibbles of the higher-order word to generate a higher-order high nibble vector;
  shifting the low-order high nibble vector by four bits;
  shifting the higher-order high nibble vector by four bits;
  using the at least one lookup table to map the high nibbles of the low-order high nibble vector to eight-bit output values of a first high nibble intermediate vector, wherein the first high nibble intermediate vector comprises bits of the high nibbles of the low-order high nibble vector interleaved with extra zeros;
  using the at least one lookup table to map the high nibbles of the higher-order high nibble vector to eight-bit output values of a second high nibble intermediate vector, wherein the second high nibble intermediate vector comprises bits of the high nibbles of the higher-order high nibble vector interleaved with extra zeros, and wherein the extra zeros of the first high nibble intermediate vector are shifted by one bit in relation to the second high nibble intermediate vector; and
  performing a bitwise-OR of the first high nibble intermediate vector and the second high nibble intermediate vector to generate the bitwise interleaved high nibble vector.

15. The method of claim 14, wherein the interleaving comprises:
  performing a bytewise interleave operation on the bitwise interleaved low nibble vector and the bitwise interleaved high nibble vector to generate the bitwise interleaved vector.

16. The method of claim 12, wherein the processing the low nibbles comprises:
  masking the high nibbles of the low-order word to generate a low-order low nibble vector;
  masking the high nibbles of the higher-order word to generate a higher-order low nibble vector;
  shifting the higher-order low nibble vector by four bits;
  performing a bitwise-OR of the low-order low nibble vector and the higher-order low nibble vector to generate a low nibble intermediate vector where each byte comprises a low nibble of the higher-order word followed by a low nibble of the low-order word; and
  using the at least one lookup table to map bytes from the low nibble intermediate vector to sixteen-bit output values of the bitwise interleaved low nibble vector, wherein the bitwise interleaved low nibble vector comprises a first byte of the low nibbles of the higher-order word interleaved with the low nibbles of the low-order word and a second byte of extra zeros.

17. The method of claim 16, wherein the processing the high nibbles comprises:
  masking the low nibbles of the low-order word to generate a low-order high nibble vector;
  masking the low nibbles of the higher-order word to generate a higher-order high nibble vector;
  shifting the low-order high nibble vector by four bits;
  performing a bitwise-OR of the low-order high nibble vector and the higher-order high nibble vector to generate a high nibble intermediate vector where each byte comprises a high nibble of the higher-order word followed by a high nibble of the low-order word; and
  using the at least one lookup table to map bytes from the high nibble intermediate vector to sixteen-bit output values of the bitwise interleaved high nibble vector, wherein the bitwise interleaved high nibble vector comprises a first byte of the high nibbles of the higher-order word interleaved with the high nibbles of the low-order word and a second byte of extra zeros.

18. The method of claim 17, further comprising:
  shifting one of the bitwise interleaved low nibble vector or the bitwise interleaved high nibble vector by eight bits.

19. The method of claim 18, wherein the interleaving comprises:
  performing a bitwise-OR of the bitwise interleaved low nibble vector and the bitwise interleaved high nibble vector to generate the bitwise interleaved vector.

20. A non-transitory computer readable medium embodying programmed instructions which, when executed by a processor, are operable for performing a method of converting bit planes into a bit field data structure, the method comprising:
  receiving a first bit plane comprising low-order bits for an array of pixels, and a second bit plane comprising higher-order bits for the pixels; and performing an interleave process on the pixels to generate bit fields for the pixels by:
  processing low nibbles of a low-order word of the low-order bits and the low nibbles of a higher-order word of the higher-order bits using at least one lookup table to generate a bitwise interleaved low nibble vector;
  processing high nibbles of the low-order word and the high nibbles of the higher-order word using the at least one lookup table to generate a bitwise interleaved high nibble vector; and
  interleaving bytes of the bitwise interleaved low nibble vector with bytes of the bitwise interleaved high nibble vector to generate a bitwise interleaved vector comprising the bit fields.

* * * * *